US012354541B2

(12) United States Patent
Kim

(10) Patent No.: US 12,354,541 B2
(45) Date of Patent: Jul. 8, 2025

(54) PIXEL CIRCUIT AND DISPLAY APPARATUS HAVING THE SAME

(71) Applicant: LG Display Co., Ltd., Seoul (KR)

(72) Inventor: Jaesung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/117,964

(22) Filed: Mar. 6, 2023

(65) Prior Publication Data

US 2023/0306908 A1 Sep. 28, 2023

(30) Foreign Application Priority Data

Mar. 25, 2022 (KR) ........................ 10-2022-0037560

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0852* (2013.01); *G09G 2300/0861* (2013.01); *G09G 2310/0202* (2013.01); *G09G 2310/061* (2013.01); *G09G 2310/08* (2013.01); *G09G 2320/0247* (2013.01)

(58) Field of Classification Search
CPC ... G09G 3/30–3291; G09G 2300/0819; G09G 2300/0842; G09G 2300/0852; G09G 2300/0861; G09G 2310/0202; G09G 2310/061; G09G 2310/08; G09G 2320/0247
See application file for complete search history.

(56) References Cited

U.S. PATENT DOCUMENTS

2016/0104424 A1* 4/2016 Lim .................... G09G 3/3233 345/76
2021/0193049 A1* 6/2021 Lin ...................... G09G 3/3266

* cited by examiner

*Primary Examiner* — Hang Lin
(74) *Attorney, Agent, or Firm* — Birch, Stewart, Kolasch & Birch, LLP

(57) ABSTRACT

A pixel circuit can include a first oxide transistor, a second oxide transistor, and a driving transistor. The driving transistor can include a gate electrode, a source electrode and a drain electrode. A capacitor, the first oxide transistor, and the second oxide transistor are connected to the gate electrode of the driving transistor. The pixel circuit can further include an emission element and a first transistor connected to the source electrode or drain electrode of the driving transistor.

17 Claims, 12 Drawing Sheets

PIXEL CIRCUIT AND DISPLAY APPARATUS HAVING THE SAME

CROSS-REFERENCE TO RELATED APPLICATION

This application claims the priority benefit of the Korean Patent Application No. 10-2022-0037560 filed on Mar. 25, 2022 in the Republic of Korea, the entire contents of this Korean application being hereby expressly incorporated by reference into the present application.

BACKGROUND

Technical Field

The present disclosure relates to a pixel circuit comprising at least one oxide transistor and a display apparatus having the pixel circuit.

Discussion of the Related Art

An organic light emitting diode (OLED) element, which is a self-luminous element, includes an anode electrode, a cathode electrode, and an organic compound layer formed between the anode electrode and the cathode electrode. The organic compound layer includes a hole transport layer HTL, an emission layer EML, and an electron transport layer ETL.

When a driving voltage is applied to the anode electrode and the cathode electrode, holes are moved to the emission layer EML through the hole transport layer HTL and electrons are moved to the emission layer EML through the electron transport layer ETL, to thereby form an exciton. As a result, the emission layer EML generates visible rays.

An active-matrix type organic light emitting display apparatus includes the OLED element which emits light by itself. As such, the active-matrix type organic light emitting display apparatus has advantages of rapid response speed, high emission efficiency, high luminance, and wide viewing angle, whereby the active-matrix type organic light emitting display apparatus has been widely used in various ways.

In the organic light emitting display apparatus, respective pixels including organic light emitting elements can be arranged in a matrix configuration, and the luminance of the pixels can be adjusted according to a grayscale of video data.

Each of the pixels includes an organic light emitting element, a driving transistor for controlling a driving current flowing to the organic light emitting element according to a gate-to-source voltage, and at least one switching transistor for programming the gate-to-source voltage of the driving transistor.

For example, a pixel circuit can have a 6T1C structure including six transistors and one storage capacitor. However, the 6T1C structure can be vulnerable to a leakage current of a gate node. In this case, when a driving frequency is lowered, a leakage current can be increased, whereby a limitation in which flickers are visible can occur. Therefore, there is a need for a method for minimizing or addressing a screen flicker defect at a low driving frequency in display apparatuses.

SUMMARY OF THE DISCLOSURE

The present disclosure has been made in view of the above problems and other limitations associated with the related art, and one or more aspects of the present disclosure provide a pixel circuit capable of overcoming or addressing a flicker phenomenon by use of an oxide transistor, and a display apparatus having the pixel circuit.

In accordance with an aspect of the present disclosure, a pixel circuit can include a first oxide transistor, a second oxide transistor, a driving transistor including a gate electrode, a source electrode and a drain electrode, wherein a capacitor, the first oxide transistor, and the second oxide transistor are connected to the gate electrode of the driving transistor, and an emission element and a first transistor connected to the source electrode or drain electrode of the driving transistor.

In accordance with another aspect of the present disclosure, a display apparatus can include a data driving circuit, a gate driving circuit, and a pixel circuit including a first oxide transistor, a second oxide transistor, a driving transistor, a first transistor, and an emission element, wherein the driving transistor includes a gate electrode, a source electrode, and a drain electrode, and the first oxide transistor and the second oxide transistor are connected to the gate electrode of the driving transistor, and the first transistor is connected to the source electrode or the drain electrode of the driving transistor.

In accordance with another aspect of the present disclosure, a display apparatus can include a data driving circuit, a gate driving circuit, and a pixel circuit including an emission element, wherein the pixel circuit is driven with a refresh frame for programming a data voltage for the pixel circuit and a reset frame for resetting an anode electrode of the emission element by the data driving circuit and the gate driving circuit, and the refresh frame includes an initial duration, a sampling duration, and an emission duration, wherein, in the initial duration, an (n)th scan signal is applied as a first level, an (n−2)th scan signal is applied as a second level higher than the first level, an emission signal is applied as the second level, and an (n)th additional scan signal is applied as the first level, where n is a natural number.

In addition to the features of the present disclosure as mentioned above, additional technical benefits and features of the present disclosure will be included within this description and drawings of the present disclosure.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings.

DETAILED DESCRIPTION OF THE EMBODIMENTS

Figure 1:
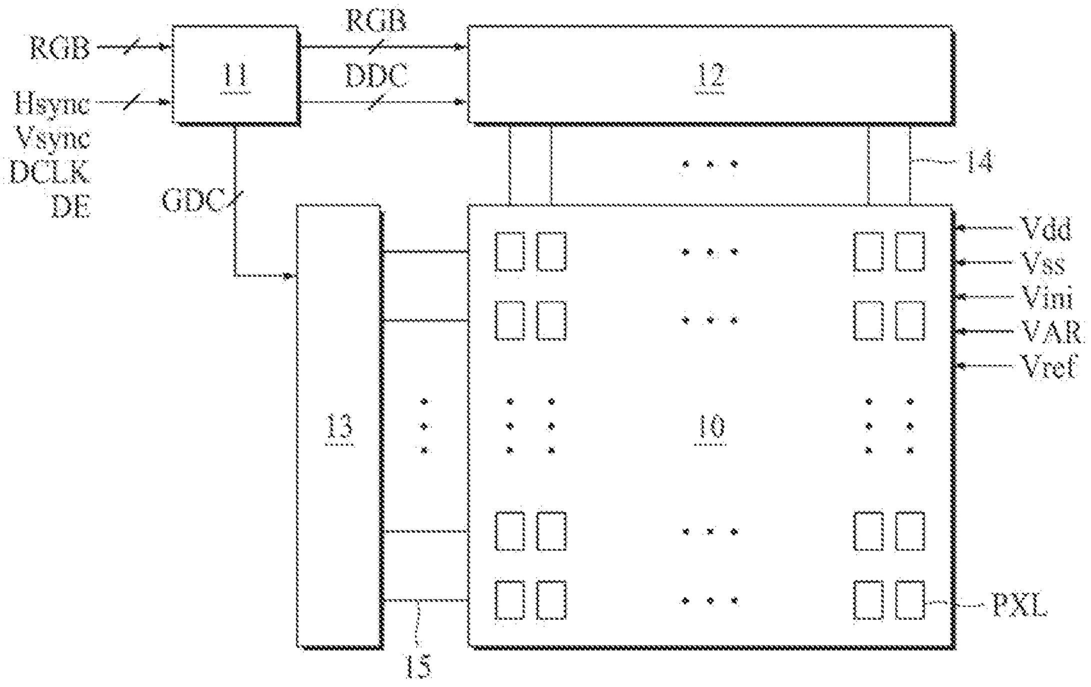
FIG. 1 is a block diagram of a display apparatus according to one embodiment of the present disclosure.

The term used in embodiments has been selected from general terms currently widely used with consideration for functionality in this disclosure, but it can vary depending on the intent or promotion of those skilled in the art, the appearance of new technology, etc. If needed, the applicant can arbitrarily select the specific term. In this case, the meaning of the term will be described in detail in the corresponding description. Therefore, the term used in the present disclosure should be defined based on the meaning of the term and the contents throughout the disclosure, instead of the simple name of term.

When a certain part of the entire disclosure includes a certain element, this means not to exclude other components unless otherwise stated, but can further include other components.

The expression "at least one of A, B, and C" described throughout the disclosure can encompass "A alone", "B alone", "C alone", "A and B", "A and C", "B and C", or "all of A, B, and C". The advantages and features of the present disclosure, and methods of achieving them will become apparent with reference to the embodiments described in detail below in conjunction with the accompanying drawings.

The shapes, sizes, ratios, angles, and numbers disclosed in the drawings for describing embodiments of the present disclosure are merely examples, and thus the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted or may be briefly discussed.

In the case in which "comprise," "have", and "include" described in the present specification are used, another part can also be present unless "only" is used. The terms in a singular form can include plural forms unless noted to the contrary. In construing an element, the element is construed as including an error region although there is no explicit description thereof.

In describing a positional relationship, for example, when the positional order is described as "on," "above," "below," "beneath", and "next," etc., the case of no contact therebetween can be included, unless "direct" is used. For example, if it is mentioned that a first element is positioned "on" a second element, it does not mean that the first element is essentially or directly positioned above the second element in a figure.

It will be understood that, although the terms "first," "second," etc. can be used herein to describe various elements, these elements should not be limited by these terms. These terms are only used to distinguish one element from another and may not define any order or sequence. For example, a first element could be termed a second element, and, similarly, a second element could be termed a first element, without departing from the scope of the present disclosure.

The area, length, or thickness of each element described in the specification is illustrated for convenience of description, and the present disclosure is not necessarily limited to the area and thickness of the illustrated configuration.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in a co-dependent relationship.

The terms to be described below are defined in consideration of the functions of the embodiments of the present specification and can be changed according to the intention of a user, an operator, or the like. Therefore, the definition should be made based on the contents throughout the specification.

A transistor included in a pixel circuit of the present disclosure can include at least one of an oxide thin film transistor Oxide TFT, an amorphous silicon a-Si TFT, and a low temperature polysilicon LTPS TFT.

The following embodiments are described with respect to an organic light emitting display apparatus. However, embodiments of the present disclosure are not limited to the organic light emitting display apparatus, and can be applied to other types of display apparatus, such as an inorganic light emitting display apparatus including an inorganic light emitting material. For example, embodiments of the present disclosure can be applied to a quantum dot display apparatus.

Terms such as "first", "second", and "third" are used to distinguish configurations for each embodiment, and the terms are not limited to these terms. Accordingly, even though the same terms are used, it can refer to other configurations according to the embodiments.

Hereinafter, embodiments of the present disclosure will be described with reference to the drawings. All components of each display apparatus according to all embodiments of the present disclosure are operatively coupled and configured.

FIG. 1 is a block diagram of a display apparatus according to one embodiment of the present disclosure.

An electroluminescent display apparatus can be applied to the display apparatus according to one embodiment of the present disclosure. The electroluminescent display apparatus can be an organic light emitting diode display apparatus, a quantum-dot light emitting diode display apparatus, or an inorganic light emitting diode display apparatus.

Referring to FIG. 1, the display apparats according to one embodiment of the present disclosure can comprise a display panel 10 having subpixels PXL for internal compensation, a data driving circuit 12 configured to drive a plurality of data lines 14, a gate driving circuit 13 configured to drive a plurality of gate lines 15, and a timing controller 11 configured to control the driving timing of the data driving circuit 12 and the gate driving circuit 13.

On the display panel 10, there are the plurality of data lines 14 and the plurality of gate lines 15 which intersect with each other, and the subpixels PXL for internal compensation are arranged in a matrix for each intersection area. The subpixels PXL arranged on the same horizontal line are connected to the same gate lines 15, and the same gate lines 15 can include at least one scan line and at least one emission control line.

For example, each subpixel PXL can be connected to one data line 14, at least one scan line, and at least one emission control line. The subpixels PXL can receive a high-potential voltage Vdd, a low-potential voltage Vss, and a reference voltage Vref from a power generator in common. In order to prevent an unnecessary emission of an organic light emitting diode OLED in initialization and sampling durations, the reference voltage Vref can be within a voltage range sufficiently lower than an operation voltage of the OLED, and can be set to be equal to or lower than the low potential voltage Vss. The subpixels PXL can receive an initialization voltage Vini and a reset voltage VAR in common from the power generator.

Thin film transistors TFTs constituting the subpixel PXL can be include an oxide transistor (or oxide TFT) including an oxide semiconductor layer. The oxide TFT can be advantageous for a large size of the display panel 10 in consideration of electron mobility, process variation, and the like. However, embodiments of the present disclosure are not limited thereto, and a semiconductor layer of the TFT can be formed of amorphous silicon, polysilicon, or the like.

Each subpixel PXL can include the plurality of TFTs and a storage capacitor to compensate for a threshold voltage Vth deviation of the driving TFT. A detailed configuration of each subpixel PXL will be described later.

In FIG. 1, a basic pixel can include at least three subpixels among white W, red R, green G, and blue B subpixels. For example, the basic pixel can be provided in combination of red R, green G, and blue B subpixels, combination of white W, red R, and green G subpixels, combination of blue B, white W, and red R subpixels, combination of green G, blue B, white W subpixels, or combination of white W, red R, green G, and blue B subpixels.

The timing controller 11 rearranges digital video data RGB inputted from the outside according to a resolution of the display panel 10 and supplies the rearranged digital video data to the data driving circuit 12. Further, the timing controller 11 can generate a data control signal DDC for controlling an operation timing of the data driving circuit 12 and a gate control signal GDC for controlling an operation timing of the gate driving circuit 13 based on timing signals such as a vertical synchronization signal Vsync, a horizontal synchronization signal Hsync, a dot clock signal DCLK, and a data enable signal DE et al.

The data driving circuit 12 converts the digital video data RGB inputted from the timing controller 11 into an analog data voltages based on the data control signal DDC and supplies the analog data voltages to the plurality of data lines 14 respectively.

The gate driving circuit 13 can generate scan signals Scan1 and Scan2 and emission signals (or emission control signals) EM on the basis of the gate control signal GDC. The gate driving circuit 13 can include a scan driver and an emission signal driver. The scan driver can generate the scan signals in a row sequential manner to drive at least one scan line connected to each pixel row and can supply the scan signals to the scan lines. The emission signal driver can generate the emission signals EM in a row sequential manner to drive at least one emission signal line connected to each pixel row and can supply the emission signals EM to the emission signal lines.

According to the embodiment, the gate driving circuit 13 can be embedded in a non-display area of the display panel 10 according to a gate-driver-in-panel GIP method, but not limited thereto. If needed, the gate driving circuit 13 can be divided into plural portions, and the divided portions of the gate driving circuit 13 can be arranged on least two side areas of the display panel 10.

Figure 2:
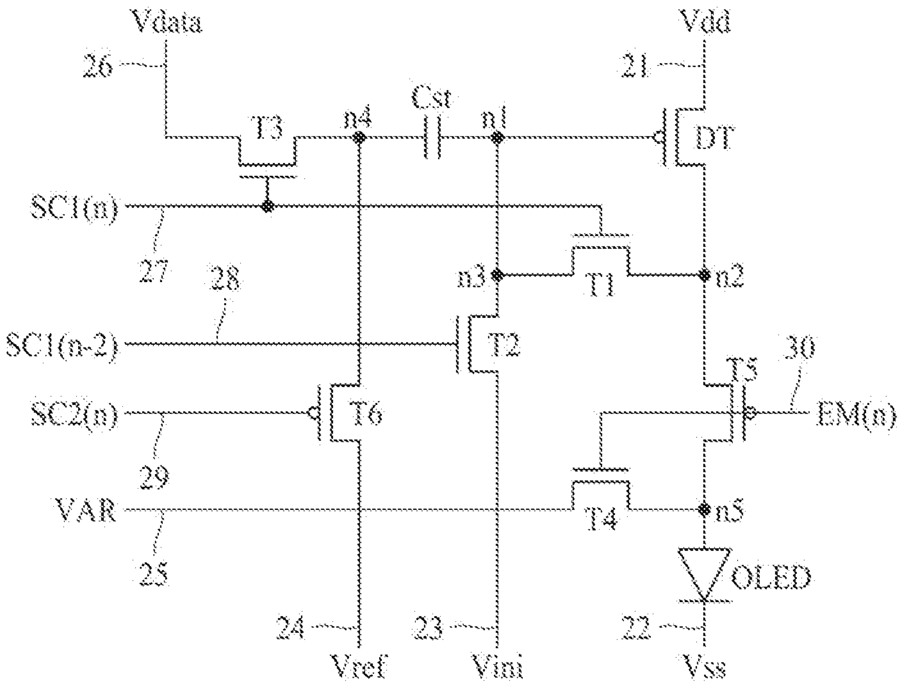
FIG. 2 illustrates a pixel circuit of the display apparatus according to one embodiment of the present disclosure.

FIG. 2 illustrates an example of a pixel circuit of the display apparatus according to one embodiment of the present disclosure. Specifically, FIG. 2 illustrates an example of a circuit of subpixel PXL (hereinafter, pixel) of FIG. 1.

Referring to FIG. 2, the pixel includes an emission element OLED, a driving TFT DT, a first TFT T1, a second TFT T2, a third TFT T3, a fourth TFT T4, a fifth TFT T5, and a sixth TFT T6, and a first capacitor Cst. According to the embodiment, a pixel structure having seven thin film transistors TFTs and one capacitor can be referred to as 7T1C, but the terms are not limited thereto.

Referring to FIG. 2, the pixel can be connected to a high-potential voltage supply line 21 for supplying a high-potential voltage Vdd, a low-potential voltage supply line 22 for supplying a low-potential voltage Vss, an initialization voltage supply line 23 for supplying an initialization voltage Vini, a reference voltage supply line 24 for supplying a reference voltage Vref, a reset voltage supply line 25 for supplying a reset voltage VAR, and a data line 26 for supplying a data voltage Vdata.

In addition, the pixel can be connected to a first scan line 27 supplying a first scan signal SC1(*n*) of an (n)th pixel row, a second scan line 28 supplying a first scan signal SC1(*n*−2) of an (n−2)th pixel row, and a third scan line 29 supplying a second scan signal SC2(*n*) of the (n)th pixel row. The first scan signal SC1(*n*) of the (n)th pixel row can include a first scan signal supplied to the pixel of FIG. 2. The first scan signal SC1(*n*−2) of the (n−2)th pixel row can include a first scan signal supplied to a pixel arranged in another previous pixel row before a previous pixel row ahead of the pixel of FIG. 2 (for example, the (n−2)th pixel row when the pixel of FIG. 2 is arranged in the (n)th pixel row, which will be referred to as a pre-previous pixel row). The second scan signal SC2(*n*) of the (n)th pixel row can include a second scan signal supplied to the pixel of FIG. 2.

According to another embodiment of the present disclosure, for convenience of description, a first scan signal SC1(*n*) of an (n)th pixel row, a first scan signal SC1(*n*−2) of an (n−2)th pixel row, and a second scan signal SC2(*n*) of the (n)th pixel row can be referred to as other terms, for example, a first scan signal, a second scan signal, and a third scan signal, but not limited thereto. In the following embodiment, the first scan signal SC1(*n*) of the (n)th pixel row is referred to as a first scan signal, the first scan signal (SC1(*n*−2) of the (n−2)th pixel row is referred to as a first scan signal SC1(*n*−2) of pre-previous pixel row, and the second scan signal SC2(*n*) of the (n)th pixel row is referred to as a second scan signal SC2(*n*).

The driving TFT DT is a transistor for driving the emission element OLED and can be referred to as a driving transistor. A first electrode and a second electrode of the driving TFT DT are respectively connected to the high-potential voltage supply line 21 and a second node n2, and a gate electrode of the driving TFT DT is connected to a first node n1. For example, the driving TFT DT can be turned-on or turned-off according to the voltage of the first node n1, and can supply the high-potential voltage Vdd, which is supplied by the high-potential voltage supply line 21, to the second node n2 during a turning-on period.

Referring to FIG. 2, the first electrode or the second electrode of the driving TFT DT can correspond to a source electrode or a drain electrode. For example, the first electrode can correspond to the source electrode and the second electrode can correspond to the drain electrode. For another example, the second electrode can correspond to the source electrode and the first electrode can correspond to the drain electrode.

According to the embodiment of the present disclosure, the first capacitor Cst, the first TFT T1, and the second TFT T2 can be connected to the gate electrode of the driving TFT DT. The first TFT T1 and the second TFT T2 connected to the gate electrode of the driving TFT DT can be oxide transistors.

A first electrode and a second electrode of the first TFT T1 are respectively connected to the second node n2 and a third node n3. A gate electrode of the first TFT T1 is connected to a first scan line 27 which provides the first scan signal SC1($n$). The first scan signal SC1($n$) can include the first scan signal supplied to the pixel (e.g., the pixel of FIG. 2) of the (n)th pixel row.

In the embodiment of the present disclosure, a second electrode of the first TFT T1 can be connected to the gate electrode of the driving TFT DT through a third node n3 and a first node n1, and a first electrode of the first TFT T1 can be connected to the second electrode of the driving TFT DT and the fifth TFT T5 through a second node n2.

The first TFT T1 can be turned-on or turned-off according to the first scan signal SC1($n$) applied through the first scan line 27 and can connect the second node n2 and the third node n3 to each other during a turning-on period.

Herein, the third node n3 is connected to the first node n1. In the drawings of the present disclosure, for convenience of description, the third node n3 and the first node n1 are distinguished from each other. However, the third node n3 can be expressed as the first node n1 according to a representation method of a circuit diagram. For example, a circuit diagram can be represented in a form in which the first capacitor Cst, the first TFT T1, and the second TFT T2 are connected to one node, for example, the first node n1. The spirit and scope of the embodiment is not limited by the circuit diagram representation method of the present disclosure.

A first electrode and a second electrode of the second TFT T2 are respectively connected to the third node n3 and the initialization voltage supply line 23. A gate electrode of the second TFT T2 is connected to a second scan line 28 supplied with the first scan signal SC1($n$−2) of pre-previous pixel row. Herein, the first scan signal SC1($n$−2) of pre-previous pixel row can share the first scan signal supplied to the pixel of the (n−2)th pixel row (for example, the pixel positioned two rows ahead of the pixel of FIG. 2).

In the embodiment of the present disclosure, the first electrode (or one side) of the second TFT T2 can be connected to at least one of the first TFT T1, the gate electrode of the driving TFT DT, and the first capacitor Cst. For example, the first electrode (or one side) of the second TFT T2 can be connected to the first TFT T1. The second electrode (or the other side) can be connected to the initialization voltage supply line 23. In another example, the first electrode of the second TFT T2 can be connected to the gate electrode of the driving TFT DT. The second electrode of the second TFT T2 can be connected to the initialization voltage supply line 23.

The second TFT T2 can be turned-on or turned-off according to the signal SC1($n$−2) applied through the second scan line 28 and can supply the initialization voltage Vini, which is supplied by the initialization voltage supply line 23, to the third node n3 during a turning-on period.

A first electrode and a second electrode of the third TFT T3 are respectively connected to a fourth node n4 and the data line 26. A gate electrode of the third TFT T3 is connected to the first scan line 27 which provides the first scan signal SC1($n$). The third TFT T3 can be turned-on or turned-off according to the signal SC1($n$) applied through the first scan line 27, and can supply the data voltage Vdata to the fourth node n4 during a turning-on period. Herein, the first electrode or the second electrode of the third TFT T3 can be a source electrode or a drain electrode. For example, the first electrode can be the source electrode and the second electrode can be the drain electrode. In another example, the second electrode can be the source electrode, and the first electrode can be the drain electrode.

A first electrode and a second electrode of the fourth TFT T4 are respectively connected to the reset voltage supply line 25 and a fifth node n5. A gate electrode of the fourth TFT T4 is connected to the emission signal line 30. In this case, the reset voltage VAR can be applied to the first electrode or the second electrode of the fourth TFT T4, and the emission signal EM can be applied to the gate electrode of the fourth TFT T4.

In the embodiment of the present disclosure, the fifth TFT T5 can be connected to the first electrode or second electrode of the fourth TFT T4. The fourth TFT T4 can be an oxide transistor, and the fifth TFT T5 can be a low temperature polycrystalline silicon LTPS transistor.

In the embodiment of the present disclosure, the first electrode or the second electrode of the fourth TFT T4 can be a source electrode or a drain electrode. For example, the first electrode can be the source electrode and the second electrode can be the drain electrode. In another example, the second electrode can be the source electrode, and the first electrode can be the drain electrode.

The fourth TFT T4 can be turned-on or turned-off according to the emission signal EM applied through the emission signal line 30 and can supply the reset voltage VAR, which is supplied by the reset voltage supply line 25, to the fifth node n5 during a turning-on period.

In the embodiment of the present disclosure, the first electrode of the fourth TFT T4 can be connected to the reset voltage supply line 25 and the second electrode of the fourth TFT T4 can be connected to at least one of the emission element OLED and the fifth TFT T5.

A first electrode and a second electrode of the fifth TFT T5 are respectively connected to the second node n2 and the fifth node n5. A gate electrode of the fifth TFT T5 is connected to the emission signal line 30. The fifth TFT T5 can be turned-on or turned-off according to the emission signal EM applied through the emission signal line 30 and can connect the second node n2 and the fifth node n5 to each other during a turning-on period.

In the embodiment of the present disclosure, the first electrode of the fifth TFT T5 can be connected to the first electrode or the second electrode of the driving TFT DT. The second electrode of the fifth TFT T5 can be connected to the emission element OLED. In this case, if the first electrode is a source electrode, the second electrode can correspond to a drain electrode. If the first electrode is a drain electrode, the second electrode can correspond to a source electrode.

A first electrode and a second electrode of the sixth TFT T6 are respectively connected to the reference voltage supply line 24 and the fourth node n4. A gate electrode of the sixth TFT T6 is connected to a third scan line 29 which provides the second scan signal SC2(*n*). Herein, the second scan signal SC2(*n*) can include the second scan signal supplied to the (n)th pixel row.

In the embodiment of the present disclosure, the reference voltage Vref is applied to the first electrode or the second electrode of the sixth TFT T6, and the second scan signal SC2(*n*) provided by the third scan line 29 is applied to the gate electrode of the sixth TFT T6.

The sixth TFT T6 can be turned-on or turned-off according to the second scan signal SC2(*n*) supplied through the third scan line 29, and can supply the reference voltage Vref, which is supplied by the reference voltage supply line 24, to the fourth node n4 during a turning-on period.

The first capacitor Cst can include a storage capacitor for maintaining a constant voltage during one frame. The first capacitor Cst is connected between the first node n1 and the fourth node n4 and is configured to constantly maintain the data voltage Vdata supplied through the third TFT T3 for one frame. For example, the first capacitor Cst can constantly maintain the gate-to-source voltage Vgs of the driving TFT DT for one frame.

In the embodiment of the present disclosure, one side of the first capacitor Cst can be connected to at least one of the gate electrode of the driving TFT DT, the first TFT T1 and the second TFT T2, and the other side thereof can be connected to at least one of the third TFT T3 and the sixth TFT T6. The first TFT T1, the second TFT T2, and the third TFT T3 can correspond to oxide transistors, and the sixth TFT can correspond to an LTPS transistor.

According to the embodiment of the present disclosure, the first capacitor Cst can be configured by a parasitic capacitor which is an internal capacitor, but not limited thereto. The first capacitor Cst can be an external capacitor intentionally designed outside the driving TFT DT.

An anode electrode of the emission element OLED is connected to the fifth node n5, and a cathode electrode can be connected to the low-potential voltage supply line 22. The low-potential voltage supply line 22 is a line supplying the low-potential voltage Vss.

According to the embodiment of the present disclosure, the emission element OLED can be an organic light emitting diode, an inorganic light emitting diode, a quantum dot light emitting element, or the like. In this case, when the emission element OLED is the organic light emitting diode, an emission layer of the emission element OLED can include an organic emission layer including an organic material.

In the embodiment of the present disclosure, the driving TFT DT, the fifth TFT T5, and the sixth TFT T6 can be P-type transistors. The first TFT T1 to fourth TFT T4 can be N-type transistors.

In case of the P-type TFT, a low-level voltage of each driving signal can indicate a gate-on voltage for turning on the TFT, and a high-level voltage of each driving signal can be a gate-off voltage for turning off the TFTs. In case of the N-type TFT, a low-level voltage of each driving signal can indicate a gate-off voltage for turning off the TFT, and a high-level voltage of each driving signal can be a gate-on voltage for turning on the TFTs.

Herein, the low-level voltage can correspond to a predetermined voltage which is lower than the high-level voltage. The high-level voltage can correspond to a predetermined voltage which is higher than the low-level voltage.

According to the embodiment of the present disclosure, the low-level voltage can be referred to as a first voltage, and the high-level voltage can be referred to as a second voltage. In this case, the first voltage can be a value which is lower than that of the second voltage.

In the embodiment of the present disclosure, the first TFT T1 and the second TFT T2 can be oxide transistors. According to another embodiment of the present disclosure, at least one of the third TFT T3 and the fourth T4 can also be the oxide transistor. In this case, the transistors (e.g., the driving TFT DT, the fifth TFT T5, and the sixth TFT T6) other than the oxide transistor can be implemented with different types of transistors, which are distinguished from the oxide transistor.

For example, the first TFT T1 and the second TFT T2 are oxide transistors, and the third TFT T3, the fourth TFT T4, the driving TFT DT, the fifth TFT T5, and the sixth TFT T6 can be low-temperature polycrystalline silicon LTPS transistors. For another example, the first TFT T1, the second TFT T2, and the third TFT T3 are oxide transistors, and the fourth TFT T4, the driving TFT DT, the fifth TFT T5, and the sixth TFT T6 can be LTPS transistors. In another example, the first TFT T1, the second TFT T2, and the fourth TFT T4 are oxide transistors, and the third TFT T3, the driving TFT DT, the fifth TFT T5, and the sixth TFT T6 can be LTPS transistors. In another example, the first TFT T1, the second TFT T2, the third TFT T3, and the fourth TFT T4 are oxide transistors, and the driving TFT DT, the fifth TFT T5, and the sixth TFT T6 can be LTPS transistors.

Figure 3A:
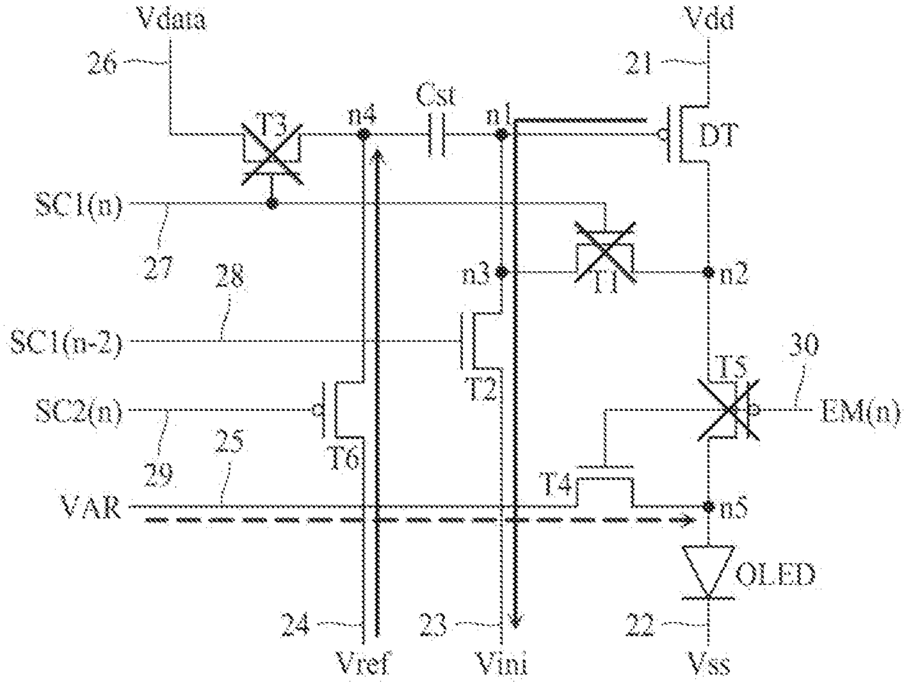
FIGS. 3A to 3C illustrate a driving in a refresh frame of the pixel circuit of the display apparatus according to one embodiment of the present disclosure.
Figure 3B:
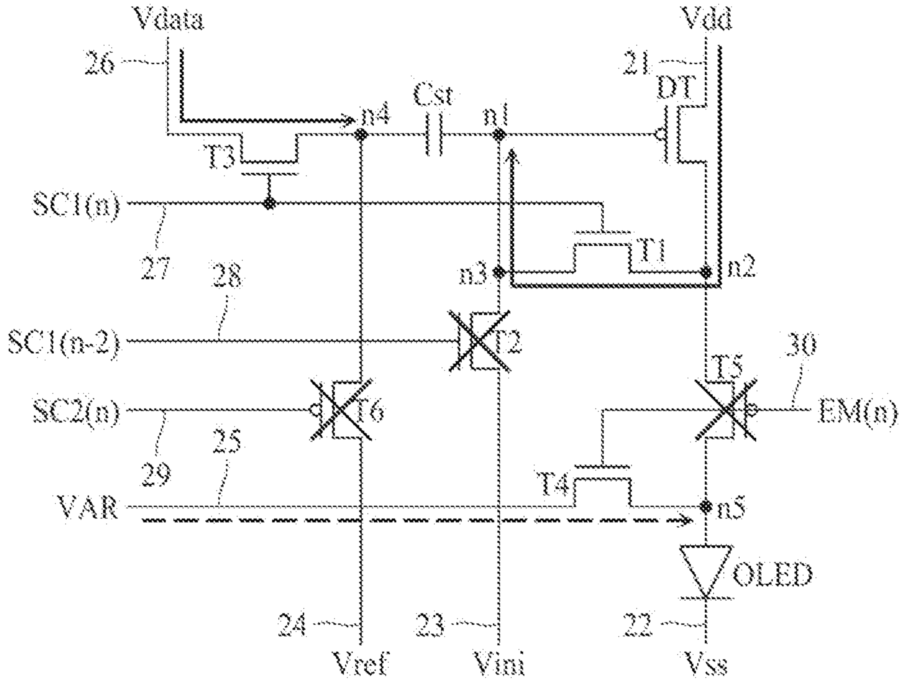
Figure 3C:
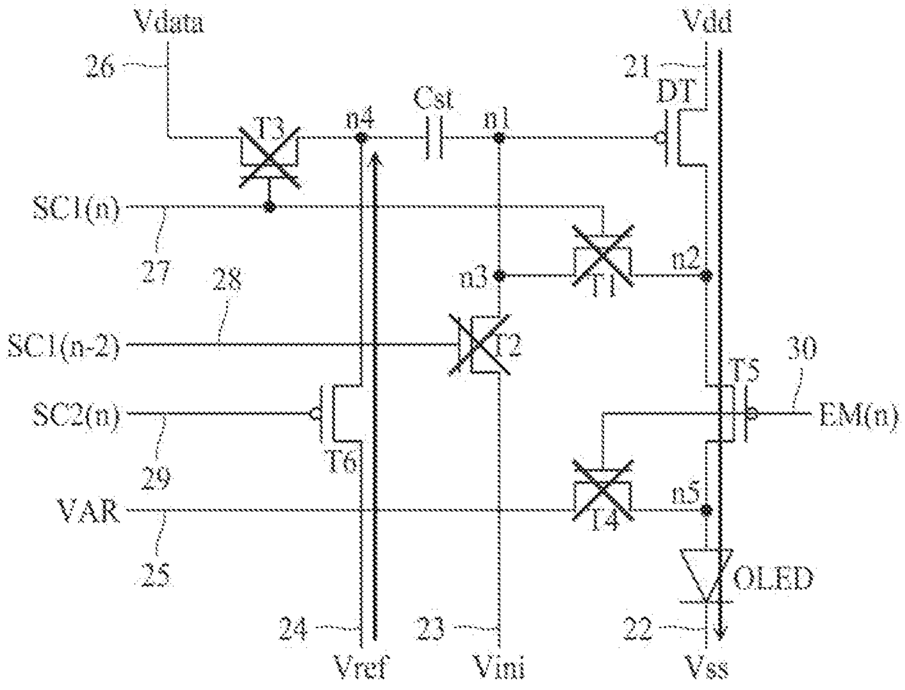
Figure 4:
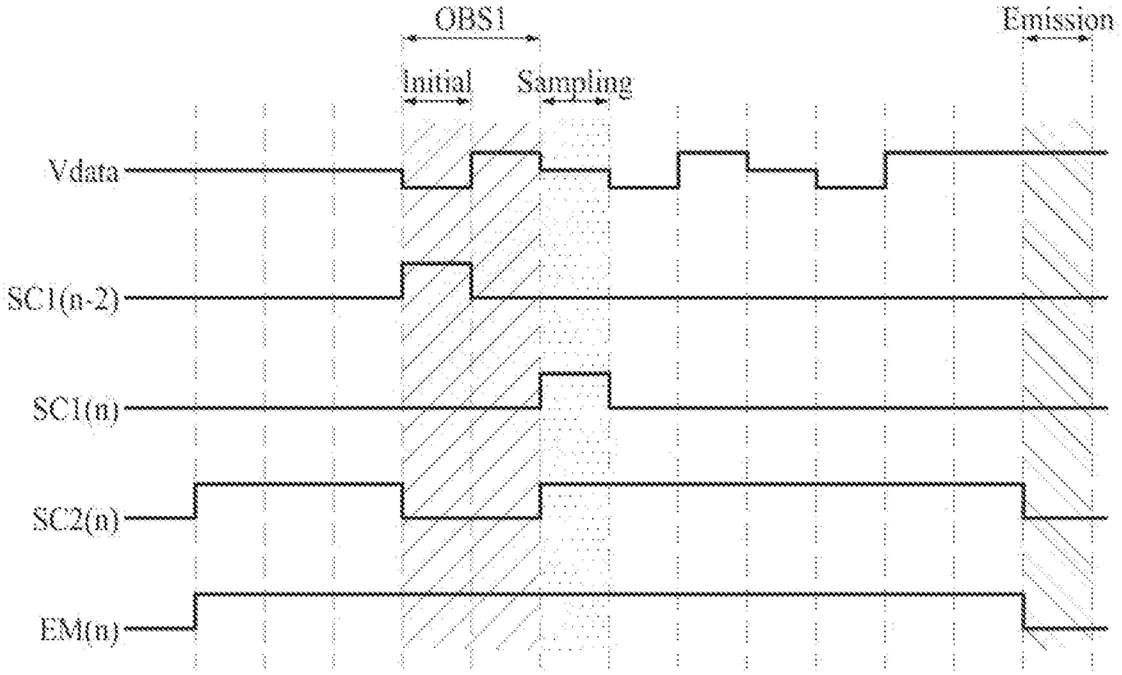
FIG. 4 illustrates a driving waveform in the refresh frame of the pixel circuit of the display apparatus according to one embodiment of the present disclosure.

FIGS. 3A to 3C illustrate a refresh frame of the pixel circuit of the display apparatus according to one embodiment of the present disclosure. FIG. 4 illustrates a driving waveform in the refresh frame.

The pixel circuit of the display apparatus can include an initial duration (or initialization duration), a sampling duration, and an emission duration in the refresh frame (or refresh period). In this case, FIG. 3A shows the initial duration, FIG. 3B shows the sampling duration, and FIG. 3C shows the emission duration. FIG. 4 shows a signal waveform for each duration of the refresh frame.

The refresh frame can be a period for refreshing the pixel, whereby the refresh frame can prevent quality degradation which might occur when the pixel is driven for a certain time or more.

Referring to FIGS. 3A and 4, the initial duration can be performed before supplying the data voltage. During the initial duration, the first scan signal SC1(*n*) and the second scan signal SC2(*n*) are inputted as a low-level voltage, the first scan signal SC1(*n*−2) of the pre-previous pixel row, and the emission signal EM(n) can be inputted as a high-level voltage. Here, n is a natural number such as a positive integer. Herein, the low-level voltage can have a voltage value smaller than the high-level voltage. The low-level voltage belongs to a voltage value range capable of turning-off the N-type TFT or turning-on the P-type TFT to which the low-level voltage is applied. For example, the low-level voltage can include a voltage included in a range of −8V to −12V. The high-level voltage belongs to a voltage value range capable of turning-on the N-type TFT or turning-off the P-type TFT to which the high-level voltage is applied, and the high-level voltage can include a voltage included in a range of 6V to 8V. However, this is merely an example, and the present embodiment is not limited to this example. In this case, the second TFT T2, the fourth TFT T4, and the sixth TFT T6 can be turned-on in the initial duration. The sixth TFT T6 is turned-on to initialize the fourth node n4 to the reference voltage Vref, and the fourth TFT T4 is turned-on to initialize the fifth node n5 to the reset voltage VAR. The anode electrode of the emission element OLED can be initialized to the reset voltage VAR.

According to the embodiment, in the initial duration, the second TFT T2 is turned-on, and the initialization voltage Vini can be input to the gate electrode of the driving TFT DT. The high-potential voltage Vdd can be inputted to the source electrode of the driving TFT DT. In this case, the gate-to-source voltage of the driving TFT DT can correspond to 'Vini−Vdd'.

Referring to FIGS. 3B and 4, the sampling duration is performed during a period in which the data voltage Vdata is supplied. During the sampling duration, the first scan signal SC1(*n*), the second scan signal SC2(*n*), and the emission signal EM(n) can be input as a high-level voltage. The first scan signal SC1(*n*−2) of the pre-previous pixel row can be inputted as a low-level voltage.

In this case, the first TFT T1 and the third TFT T3 can be turned-on by the first scan signal SC1(*n*) in the sampling duration. The fourth TFT T4 is turned-on according to the emission signal EM(n), and the fifth TFT T5 can be turned-off according to the emission signal EM(n). Accordingly, the data voltage Vdata can be charged in the first capacitor Cst.

In the embodiment, a 'Vdd+Vth' level voltage corresponding to a sum of high-potential voltage and threshold voltage Vth of the driving TFT DT can be charged to the first node n1 by the first TFT T1 in the sampling duration. Therefore, the threshold voltage of the driving TFT DT can be sensed.

According to the embodiment of the present invention, in the sampling duration, the voltage corresponding to the sum of high-potential voltage Vdd and threshold voltage Vth can be inputted to the gate electrode of the driving TFT DT. The high-potential voltage Vdd can be input to the source electrode of the driving TFT DT. In this case, the gate-to-source voltage of the driving TFT DT can correspond to the threshold voltage Vth.

Referring to FIGS. 3C and 4, the emission duration is performed after the sampling duration. In the emission duration, the first scan signal SC1(*n*), the second scan signal SC2(*n*), the first scan signal SC1(*n*−2) of the pre-previous pixel row, and the emission signal EM can be inputted as a low-level voltage.

In this case, the fifth TFT T5 and the sixth TFT T6 are turned-on in the emission duration, and the first TFT T1 to the fourth TFT T4 can be turned-off. An OLED driving voltage corresponding to a voltage stored in the first capacitor Cst is supplied to the emission element OLED based on the fifth TFT T5 being turned-on, and thus the emission element OLED can emit light.

According to the embodiment, in the emission duration, 'Vdd+Vth+(Vref−Vdata)' can be inputted to the gate electrode of the driving TFT DT. The high-potential voltage Vdd can be inputted to the source electrode of the driving TFT DT. In this case, the gate-to-source voltage of the driving TFT DT can correspond to 'Vth+(Vref−Vdata)'.

In the embodiment, according as the display apparatus is continuously driven, a hysteresis phenomenon in which the threshold voltage Vth of the driving transistor changes can occur. To this end, the refresh frame can include a first OBS (On-Bias-Stress) duration OBS1 to mitigate the hysteresis of the driving TFT DT. A predetermined bias voltage can be inputted to the driving TFT DT in the first OBS duration. In this case, the gate-to-source voltage Vgs of the driving TFT DT can be constantly maintained so that it is possible to overcome a flicker phenomenon which might occur in the display apparatus. The sampling duration can be performed after the first OBS duration. According to a driving method of the first OBS duration, an OBS driver can be additionally included in the display apparatus, but not necessarily.

Referring to FIG. 4, the first scan signal SC2(*n*−2) of the pre-previous pixel row can be inputted as a low-level voltage in the other portions of the first OBS duration OBS1 except the initial duration. In this case, the second TFT T2 can be turned-off.

According to the embodiment of the present disclosure, the OBS duration can be referred to as a compensation duration. In this case, the first OBS duration OBS1 can be referred to as a first compensation duration, and a second OBS duration, which will be described later, can be referred to as a second compensation duration. In the compensation duration, the threshold voltage Vth of the driving TFT DT can be changed based on a compensation voltage.

Figure 5A:
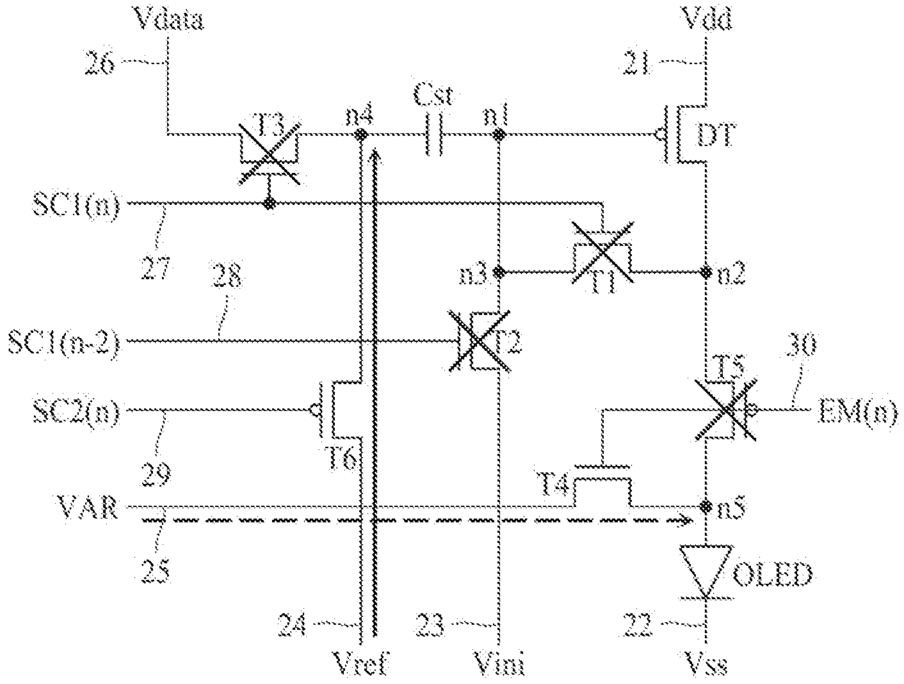
FIGS. 5A and 5B illustrate a driving in an anode reset frame of the pixel circuit of the display apparatus according to one embodiment of the present disclosure.
Figure 5B:
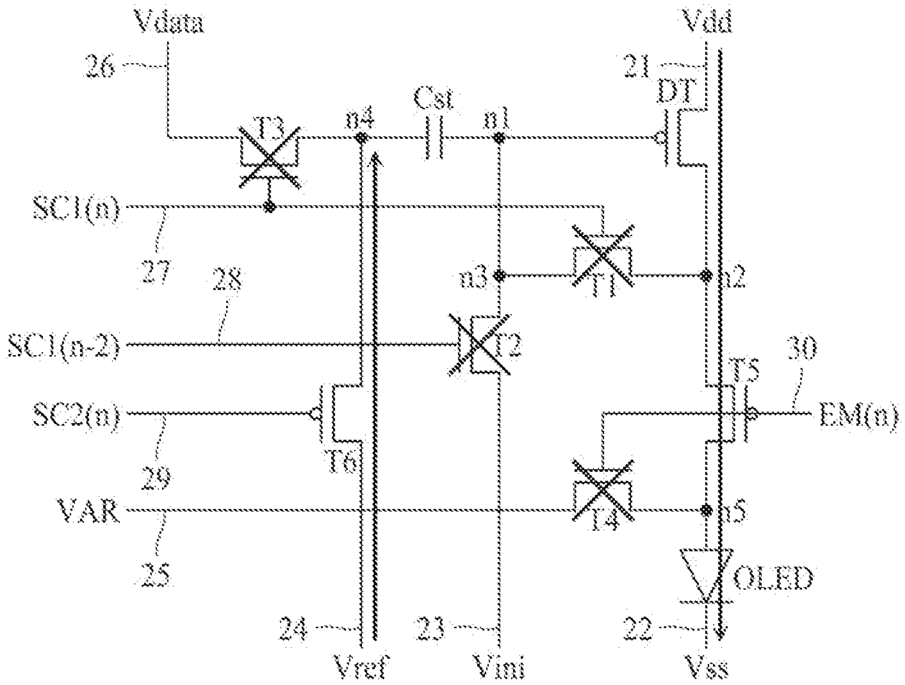
Figure 6:
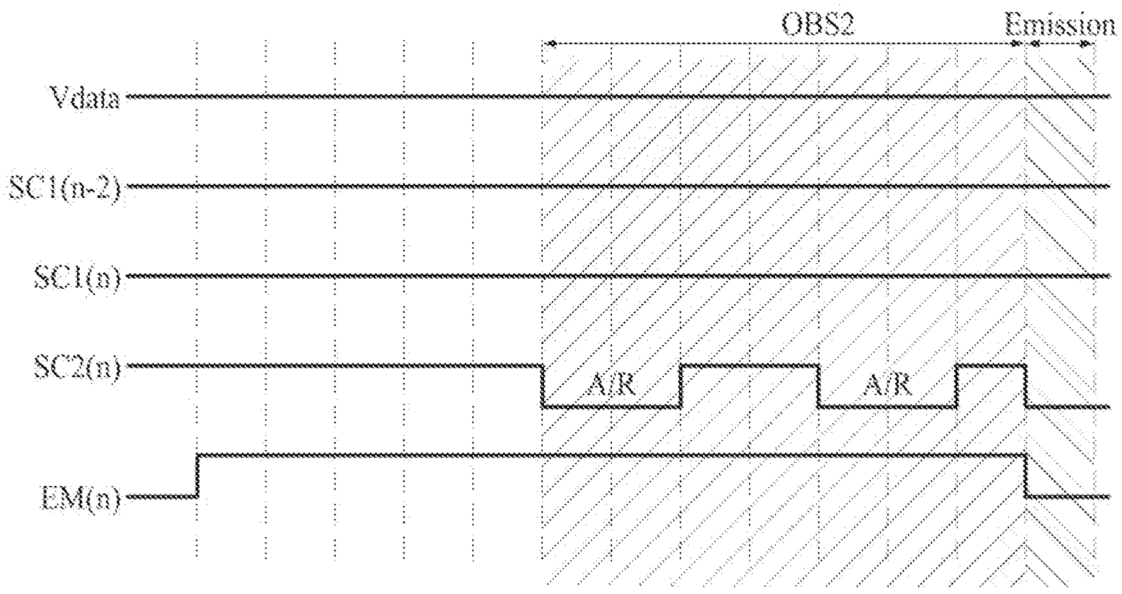
FIG. 6 illustrates a driving waveform in the anode reset frame of the pixel circuit of the display apparatus according to one embodiment of the present disclosure.

FIGS. 5A and 5B illustrate a driving in an anode reset frame of the pixel circuit of the display apparatus according to one embodiment of the present disclosure. FIG. 6 illustrates a driving waveform in the anode reset frame of the pixel circuit of the display apparatus according to one embodiment of the present disclosure. Hereinafter, the same contents as those described above can be omitted.

The pixel circuit of the display apparatus can include a reset duration A/R and an emission duration in the anode reset frame (or anode reset period). In this case, FIG. 5A shows the reset duration, and FIG. 5B shows the emission duration. FIG. 6 shows a signal waveform for each duration of the anode reset frame.

In the embodiment of the present disclosure, a case where the emission duration is included in the anode reset frame is exemplarily illustrated, but not limited thereto. According to the embodiment of the present disclosure, the emission duration can be distinguished from the anode reset frame.

The anode reset frame is a period for initializing the anode electrode of the emission element. The anode reset frame can prevent a deterioration of quality, which might occur in the emission element when the pixel is driven for a predetermined time or more.

Referring to FIGS. 5A and 6, the reset duration A/R can be performed during a period in which the data voltage is not supplied. In the reset duration A/R, the first scan signal SC1(*n*), the first scan signal SC1(*n*−2) of the pre-previous pixel row, and the second scan signal SC2(*n*) can be inputted as a low-level (or first-level) voltage. In the reset duration A/R, the emission signal EM(n) can be inputted as a high-level (or second level, herein, second level>first level) voltage.

In this case, the fourth TFT T4 and the sixth TFT T6 are turned-on, whereby the fourth node n4 is initialized to the reference voltage Vref, and the fifth node n5 is initialized to the reset voltage VAR. Accordingly, the anode electrode of the emission element OLED can be initialized to the reset voltage VAR.

In the embodiment, since the second TFT T2 is in a turn-off state during the reset duration A/R, the initialization voltage Vini may not be inputted to the gate electrode of the driving TFT DT. For example, in the reset duration A/R, the anode electrode of the emission element OLED can be initialized separately from the driving TFT DT.

Referring to FIG. 6, the anode reset frame can include a second OBS duration OBS2. The second OBS duration OBS2 can be a duration for mitigating hysteresis of the driving TFT DT. The reset duration A/R can be included in the second OBS duration OBS2. A predetermined bias voltage can be inputted to the driving TFT DT in the second OBS duration OBS2. The bias voltage can correspond to 'Vref−OBS', but not limited thereto. In this case, the gate-to-source voltage Vgs of the driving TFT DT can be constantly maintained so that it is possible to overcome a flicker phenomenon which might occur in the display apparatus. The sampling duration can be performed after the second OBS duration OBS2. According to a driving method of the second OBS duration, an OBS driver can be additionally included in the display apparatus, but not necessarily.

According to the embodiment of the present disclosure, a bias voltage in the second OBS duration OBS2 can be applied to the gate electrode of the driving TFT DT based on a coupling of the first capacitor Cst. The reference voltage Vref is applied to the first node n1 in the emission duration, so that the gate-to-source voltage Vgs of the driving TFT DT can be restored.

Referring to FIG. 6, the second scan signal SC2(*n*) can be inputted as a high-level voltage in the other portions of the second OBS duration OBS2 except the reset duration A/R. In this case, the sixth TFT T6 can be turned-off. In this case, the reference voltage Vref can be input to the gate electrode of the driving TFT DT. Accordingly, the source-to-drain voltage Vgs of the driving TFT DT can be restored to a previous setting value. In this case, the threshold voltage variation is minimized, thereby stably driving the pixel circuit.

Referring to FIGS. 5B and 6, the emission duration is performed after the reset duration A/R. In the emission duration, the first scan signal SC1(*n*), the second scan signal SC2(*n*), the first scan signal SC1(*n*−2) of the pre-previous pixel row, and the emission signal EM(n) can be input as a low-level voltage.

In this case, the fifth TFT T5 and the sixth TFT T6 are turned-on, and the first TFT T1 to fourth TFT T4 can be turned-off. According as the fifth TFT T5 is turned-on, an OLED driving voltage corresponding to a voltage stored in the first capacitor Cst is supplied to the emission element OLED, whereby the emission element OLED can emit light.

In the embodiment of the present disclosure, the emission duration of FIG. 5B can correspond to the emission duration of FIG. 3C. For example, the emission duration of the refresh frame and the anode reset frame can be the duration in which the same operation is performed.

Figure 7:
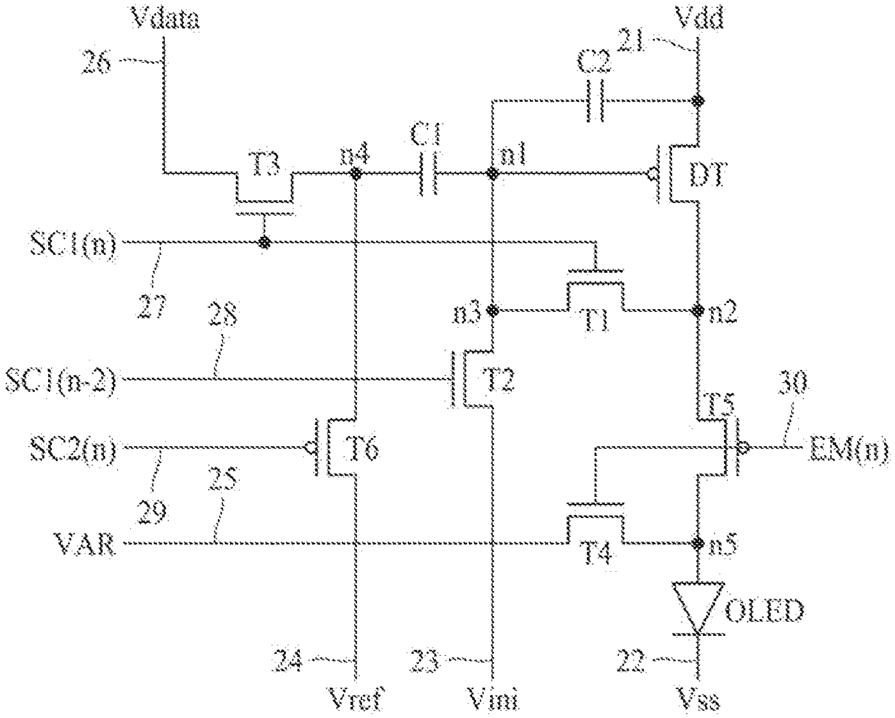
FIG. 7 illustrates an example of a pixel circuit of a display apparatus according to another embodiment of the present disclosure.

FIG. 7 illustrates an example of a pixel circuit of a display apparatus according to another embodiment of the present disclosure. Specifically, FIG. 7 is a diagram illustrating another example of a circuit of a subpixel PXL (hereinafter, pixel) of FIG. 1. Hereinafter, the same contents as those described above can be omitted.

Referring to FIG. 7, a pixel includes an emission element OLED, a driving TFT DT, a first TFT T1, a second TFT T2, a third TFT T3, a fourth TFT T4, a fifth TFT T5, and a sixth TFT T6, a first capacitor C1, and a second capacitor C2. According to the embodiment, a pixel structure having seven thin film transistors TFTs and two capacitors can be referred to as 7T2C, but the terms are not limited thereto.

Referring to FIG. 7, the pixel can be connected to a high-potential voltage supply line for supplying a high-potential voltage Vdd, a low-potential voltage supply line for supplying a low-potential voltage Vss, an initialization voltage supply line for supplying an initialization voltage Vini, a reference voltage supply line for supplying a reference voltage Vref, a reset voltage supply line for supplying a reset voltage VAR, and a data voltage supply line for supplying a data voltage Vdata.

Further, the pixel can be connected to a first scan line for supplying a first scan signal SC1(*n*) of an (n)th pixel row, a second scan line for supplying a first scan signal SC1(*n*−2) of an (n−2)th pixel row, and a third scan line for supplying a second scan signal SC2(*n*) of the (n)th pixel row. Herein, the first scan signal SC1(*n*) of the (n)th pixel row can include a first scan signal corresponding to the pixel of FIG. 7. The first scan signal SC1(*n*−2) of the (n−2)th pixel row can include a first scan signal corresponding to another previous pixel row before a previous pixel row ahead of the pixel of FIG. 7 (for example, the (n−2)th pixel row when the pixel of FIG. 7 is arranged in the (n)th pixel row), for example, pre-previous pixel row. The second scan signal SC2(*n*) of the (n)th pixel row can include a second scan signal corresponding to the pixel of FIG. 7.

According to another embodiment of the present disclosure, for convenience of description, a first scan signal SC1(*n*) of an (n)th pixel row, a first scan signal SC1(*n*−2) of an (n−2)th pixel row, and a second scan signal SC2(*n*) of the (n)th pixel row can be referred to as other terms, for example, a first scan signal, a second scan signal, and a third scan signal, but not limited thereto. In the following embodiment, the first scan signal SC1(*n*) of the (n)th pixel row is referred to as a first scan signal, the first scan signal SC1(*n*−2) of the (n−2)th pixel row is referred to as a first scan signal SC1(*n*−2) of pre-previous pixel row, and the second scan signal SC2(*n*) of the (n)th pixel row is referred to as a second scan signal SC2(*n*).

The driving TFT DT is a transistor for driving the emission element OLED and can be referred to as a driving transistor. A first electrode and a second electrode of the driving TFT DT are respectively connected to the high-potential voltage supply line and a second node n2, and a gate electrode of the driving TFT DT is connected to a first node n1. For example, the driving TFT DT can be turned-on or turned-off according to the voltage of the first node n1, and can supply the high-potential voltage Vdd, which is supplied by the high-potential voltage supply line, to the second node n2 during a turning-on period.

Referring to FIG. 7, the first electrode or the second electrode of the driving TFT DT can correspond to a source electrode or a drain electrode. For example, the first electrode can correspond to the source electrode and the second electrode can correspond to the drain electrode. For another example, the second electrode can correspond to the source electrode and the first electrode can correspond to the drain electrode.

According to the embodiment of the present disclosure, the first capacitor C1, the second capacitor C2, the first TFT T1, and the second TFT T2 can be connected to the gate electrode of the driving TFT DT. The first TFT T1 and the second TFT T2 connected to the gate electrode of the driving TFT DT can be oxide transistors.

A first electrode and a second electrode of the first TFT T1 are respectively connected to the second node n2 and a third node n3. A gate electrode of the first TFT T1 is connected to a first scan line which provides the first scan signal SC1(*n*). The first scan signal SC1(*n*) can include a first scan signal supplied to the pixel (e.g., the pixel of FIG. 7) of the (n)th pixel row.

In the embodiment of the present disclosure, one side of the first TFT T1 can be connected to the gate electrode of the driving TFT DT, and the other side of the first TFT T1 can be connected to the fifth TFT T5. In this case, the first TFT T1 can be an oxide transistor, and the fifth TFT T5 can be an LTPS transistor.

The first TFT T1 can be turned-on or turned-off according to the signal applied through the first scan line and can connect the second node n2 and the third node n3 to each other during a turning-on period.

Herein, the third node n3 is connected to the first node n1. In the drawings of the present disclosure, for convenience of description, the third node n3 and the first node n1 are distinguished from each other. However, the third node n3 can be expressed as the first node n1 according to a representation method of a circuit diagram. For example, a circuit diagram can be represented in a form in which the first capacitor C1, the second capacitor C2, the first TFT T1, and the second TFT T2 are connected to one node, for example, the first node n1. The spirit and scope of the embodiment is not limited by the circuit diagram representation method of the present disclosure.

A first electrode and a second electrode of the second TFT T2 are respectively connected to the third node n3 and the initialization voltage supply line. A gate electrode of the second TFT T2 is connected to the second scan line for supplying the first scan signal SC1(*n*−2) of the pre-previous pixel row. Herein, the first scan signal SC1(*n*−2) of the pre-previous pixel row can include a first scan signal corresponding to the pixel of the (n−2)th pixel row (for example, the pixel positioned two rows ahead of the pixel of FIG. 7).

In the embodiment of the present disclosure, one side of the second TFT T2 (for example, first electrode or second electrode) can be connected to at least one of the first TFT T1, the gate electrode of the driving TFT DT, the first capacitor C1, and the second capacitor C2. For example, the first electrode (or one side) of the second TFT T2 can be connected to the first TFT T1. The second electrode (or the other side) can be connected to the initialization voltage supply line. In another example, the first electrode of the second TFT T2 can be connected to the gate electrode of the driving TFT DT. The second electrode of the second TFT T2 can be connected to the initialization voltage supply line.

The second TFT T2 can be turned-on or turned-off according to the signal applied through the second scan line and can supply the initialization voltage Vini, which is supplied by the initialization voltage supply line, to the third node n3 during a turning-on period.

A first electrode and a second electrode of the third TFT T3 are respectively connected to a fourth node n4 and the data voltage supply line. A gate electrode of the third TFT T3 is connected to the first scan line which provides the first scan signal SC1(*n*). The third TFT T3 can be turned-on or turned-off according to the signal applied through the first scan line, and can supply the data voltage Vdata to the fourth node n4 during a turning-on period. Herein, the first electrode or the second electrode of the third TFT T3 can be a source electrode or a drain electrode. For example, the first electrode can be the source electrode and the second electrode can be the drain electrode. In another example, the second electrode can be the source electrode, and the first electrode can be the drain electrode.

A first electrode and a second electrode of the fourth TFT T4 are respectively connected to the reset voltage supply line and a fifth node n5. A gate electrode of the fourth TFT T4 is connected to the emission signal line. In this case, the reset voltage VAR can be applied to the first electrode or the second electrode of the fourth TFT T4, and the emission signal EM can be applied to the gate electrode of the fourth TFT T4.

In the embodiment of the present disclosure, the fifth TFT T5 can be connected to the first electrode or second electrode (or one side) of the fourth TFT T4. The fourth TFT T4 can be an oxide transistor, and the fifth TFT T5 can be an LTPS transistor.

In the embodiment of the present disclosure, the first electrode or the second electrode of the fourth TFT T4 can be a source electrode or a drain electrode. For example, the first electrode can be the source electrode and the second electrode can be the drain electrode. In another example, the second electrode can be the source electrode, and the first electrode can be the drain electrode.

The fourth TFT T4 can be turned-on or turned-off according to the emission signal EM applied through the emission signal line and can supply the reset voltage VAR, which is supplied by the reset voltage supply line, to the fifth node n5 during a turning-on period.

In the embodiment of the present disclosure, one side of the fourth TFT T4 can be connected to the reset voltage supply line and the other side thereof can be connected to at least one of the emission element OLED and the fifth TFT T5.

A first electrode and a second electrode of the fifth TFT T5 are respectively connected to the second node n2 and the fifth node n5. A gate electrode of the fifth TFT T5 is connected to the emission signal line. The fifth TFT T5 can be turned-on or turned-off according to the emission signal EM applied through the emission signal line and can connect the second node n2 and the fifth node n5 to each other during a turning-on period.

In the embodiment of the present disclosure, one side of the fifth TFT T5 can be connected to the first electrode or the second electrode of the driving TFT DT. The other side of the fifth TFT T5 can be connected to the emission element OLED. In this case, if the first electrode is the source electrode, the second electrode can correspond to the drain electrode. If the first electrode is the drain electrode, the second electrode can correspond to the source electrode.

A first electrode and a second electrode of the sixth TFT T6 are respectively connected to the reference voltage supply line and the fourth node n4. A gate electrode of the sixth TFT T6 is connected to the third scan line which provides the second scan signal SC2(*n*). Herein, the second scan signal SC2(*n*) can include a second scan signal corresponding to the (n)th pixel.

In the embodiment of the present disclosure, the reference voltage Vref is applied to the first electrode or the second electrode of the sixth TFT T6, and the second scan signal SC2(*n*) provided by the third scan line is applied to the gate electrode of the sixth TFT T6.

The sixth TFT T6 can be turned-on or turned-off according to the second scan signal SC2(*n*) supplied through the third scan line, and can supply the reference voltage Vref, which is supplied by the reference voltage supply line, to the fourth node n4 during a turning-on period.

The first capacitor C1 can include a storage capacitor for maintaining a constant voltage during one frame. The first capacitor C1 is connected between the first node n1 and the fourth node n4 and is configured to constantly maintain the data voltage Vdata supplied through the third TFT T3 for one frame. For example, the first capacitor C1 can constantly maintain the gate-to-source voltage Vgs of the driving TFT DT for one frame.

In the embodiment of the present disclosure, one side of the first capacitor C1 can be connected to at least one of the gate electrode of the driving TFT DT, the first TFT T1, and the second TFT T2, and the other side thereof can be connected to at least one of the third TFT T3 and the sixth TFT T6. The first TFT T1, the second TFT T2, and the third TFT T3 can correspond to oxide transistors, and the sixth TFT can correspond to an LTPS transistor.

According to the embodiment of the present disclosure, the first capacitor C1 can be configured by a parasitic capacitor which is an internal capacitor, but not limited thereto. The first capacitor C1 can be an external capacitor intentionally designed outside the driving TFT DT.

In the embodiment, the first capacitor C1 can correspond to the first capacitor Cst of FIG. 2. For example, the first capacitor C1 can perform the same function as that of the first capacitor Cst of FIG. 2.

One side of the second capacitor C2 can be connected to a gate node (or first node n1) of the driving TFT DT. The other side of the second capacitor C2 can be connected to the first electrode or the second electrode of the driving TFT DT. In addition, the other side of the second capacitor C2 can be connected to the high-potential voltage supply line.

In the embodiment, the second capacitor C2 can reduce a change in the gate-to-source voltage Vgs of the driving TFT DT by a ripple of the reference voltage Vref when the emission element OLED emits light.

An anode electrode of the emission element OLED is connected to the fifth node n5, and a cathode electrode thereof is connected to the low-potential voltage supply line. Herein, the low-potential voltage supply line is a line supplying the low-potential voltage Vss.

According to the embodiment of the present disclosure, the emission element OLED can be an organic light emitting diode, an inorganic light emitting diode, a quantum dot light emitting element, or the like. In this case, if the emission element OLED is an organic light emitting diode, the emission layer EL of the emission element OLED can include an organic light emitting layer including an organic material.

In the embodiment of the present disclosure, the driving TFT DT, the fifth TFT T5, and the sixth TFT T6 can be P-type transistors. The first TFT T1 to fourth TFT T4 can be N-type transistors. In case of the P-type TFT, a low-level voltage of each driving signal can indicate a voltage for turning on the TFT, and a high-level voltage of each driving signal can be a voltage for turning off the TFTs. Herein, the low-level voltage can correspond to a predetermined voltage lower than the high-level voltage. For example, the low-level voltage can include a voltage corresponding to a range of −8V to −12V, and the high-level voltage can correspond to a predetermined voltage higher than the low-level voltage. For example, the high-level voltage can include a voltage within a range of 6V to 8V.

According to the embodiment of the present disclosure, the low-level voltage can be referred to as a first voltage, and the high-level voltage can be referred to as a second voltage. In this case, the first voltage can be a value lower than the second voltage.

In the embodiment of the present disclosure, the first TFT T1 and the second TFT T2 can be oxide transistors. In some cases, at least one of the third TFT T3 and the fourth TFT T4 can also be an oxide transistor. In this case, transistors (for example, the driving TFT DT, the fifth TFT T5, and the sixth TFT T6) other than the oxide transistor can be implemented with different types of transistors different from the oxide transistor.

For example, the first TFT T1 and the second TFT T2 are oxide transistors, and the third TFT T3, the fourth TFT T4, the driving TFT DT, the fifth TFT T5, and the sixth TFT T6 can be low-temperature polycrystalline silicon LTPS transistors. For another example, the first TFT T1, the second TFT T2, and the third TFT T3 can be oxide transistors, and the fourth T4, the driving TFT DT, the fifth TFT T5, and the sixth TFT T6 can be LTPS transistors. In another example, the first TFT T1, the second TFT T2, and the fourth TFT T4 are oxide transistors, and the third TFT T3, the driving TFT DT, the fifth TFT T5, and the sixth TFT T6 can be LTPS transistors. In another example, the first TFT T1, the second TFT T2, the third TFT T3, and the fourth TFT T4 are oxide transistors, and the driving TFT DT, the fifth TFT T5, and the sixth TFT T6 can be LTPS transistors.

Figure 8A:
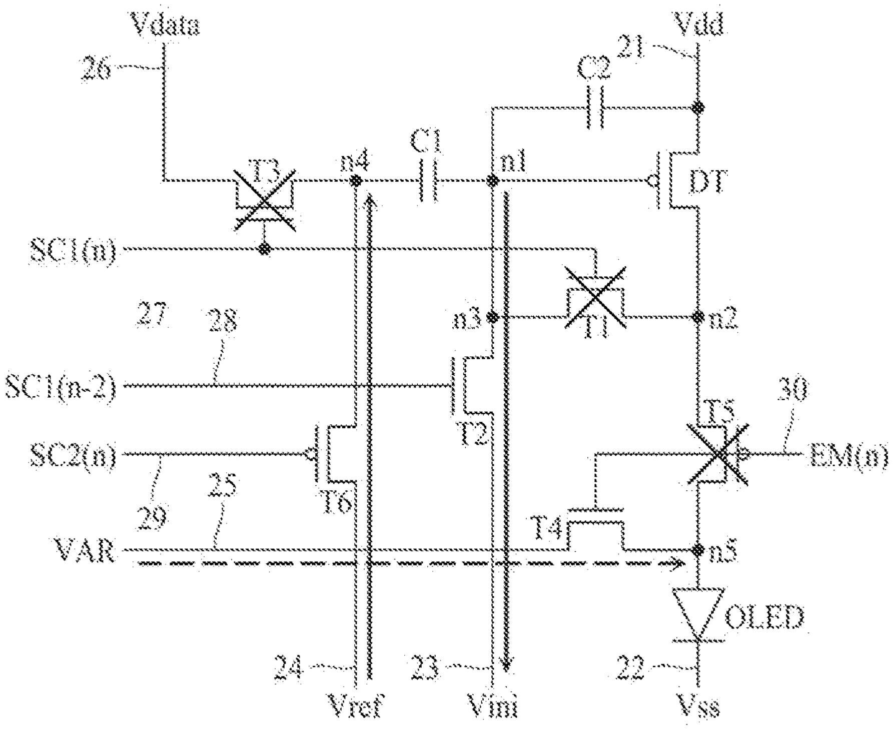
FIGS. 8A to 8C illustrate a driving in a refresh frame of the pixel circuit of the display apparatus according to another embodiment of the present disclosure.
Figure 8B:
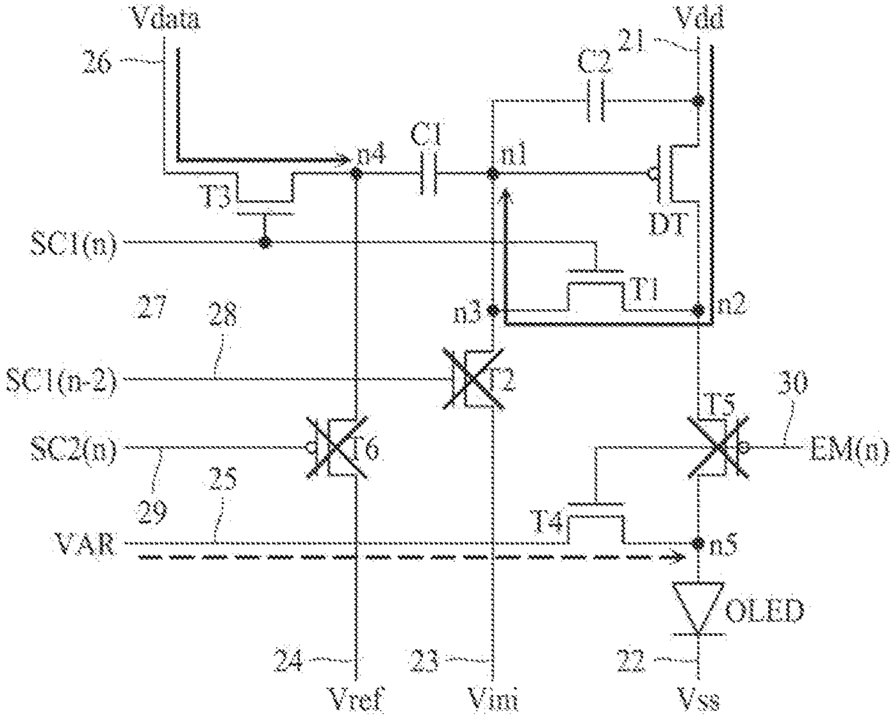
Figure 8C:
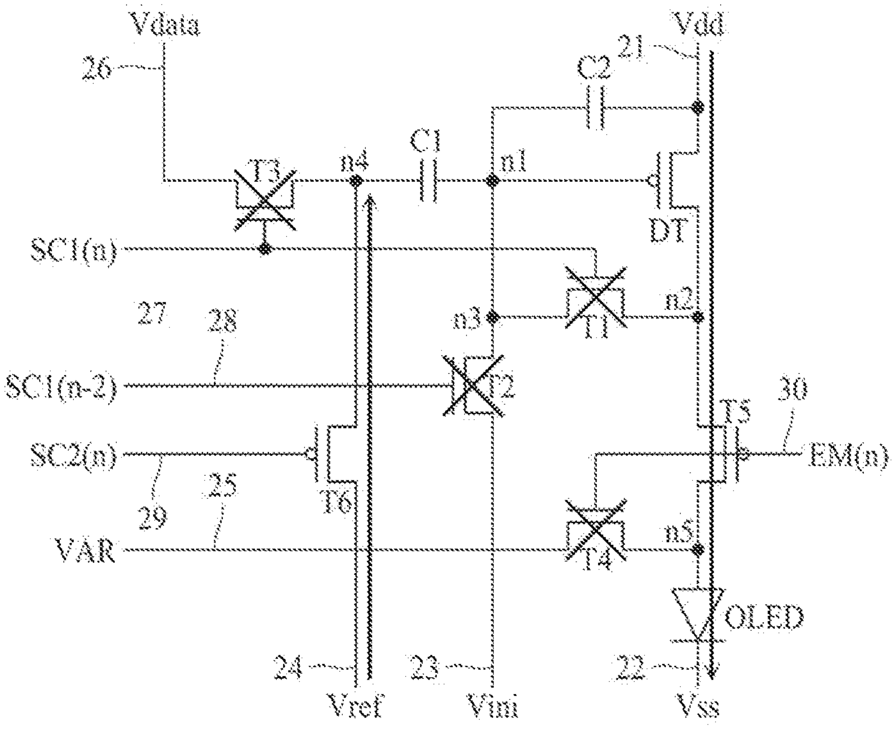
Figure 9:
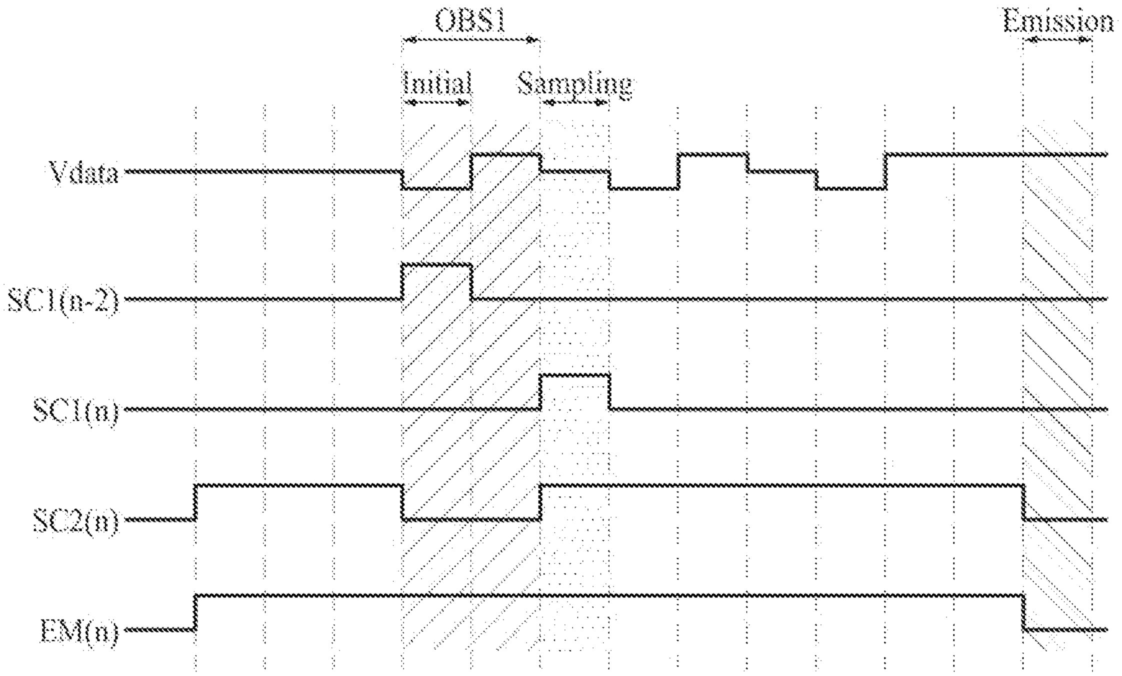
FIG. 9 illustrates a driving waveform in the refresh frame of the pixel circuit of the display apparatus according to another embodiment of the present disclosure.

FIGS. 8A to 8C illustrate a driving in a refresh frame of a pixel circuit of a display apparatus according to another embodiment of the present disclosure. FIG. 9 illustrates a driving waveform in the refresh frame of the pixel circuit of the display apparatus according to another embodiment of the present disclosure.

The pixel circuit of the display apparatus can include an initial duration (or an initialization duration), a sampling duration, and an emission duration in the refresh frame (or refresh period). In this case, FIG. 8A shows the initial duration, FIG. 8B shows the sampling duration, and FIG. 8C shows the emission duration. FIG. 9 shows a signal waveform for each duration of the refresh frame.

The refresh frame can be a period for refreshing the pixel, whereby the refresh frame can prevent quality degradation which might occur when the pixel is driven for a certain time or more.

Referring to FIGS. 8A and 9, the initial duration can be performed before supplying the data voltage. In the initial duration, the first scan signal SC1(*n*) and the second scan signal SC2(*n*) are inputted as a low-level voltage, the first scan signal SC1(*n*−2) of the pre-previous pixel row, and the emission signal EM can be inputted as a high-level voltage. Herein, the low-level voltage can have a voltage value smaller than the high-level voltage. The low-level voltage belongs to a voltage value range capable of turning-on the TFT to which the low-level voltage is applied. For example, the low-level voltage can include a voltage included in a range of −8V to −12V. The high-level voltage belongs to a voltage value range capable of turning-off the TFT to which the high-level voltage is applied, and the high-level voltage can include a voltage included in a range of 6V to 8V. However, this is merely an example, and the present embodiment is not limited to this example.

In this case, the second TFT T2, the fourth TFT T4, and the sixth TFT T6 can be turned-on, whereby the fourth node n4 is initialized to the reference voltage Vref, and the fifth node n5 can be initialized to the reset voltage VAR. The anode electrode of the emission element OLED can be initialized to the reset voltage VAR.

According to the embodiment, in the initial duration, the initialization voltage Vini can be input to the gate electrode of the driving TFT DT. The high-potential voltage Vdd can be inputted to the source electrode of the driving TFT DT. In this case, the gate-to-source voltage of the driving TFT DT can correspond to 'Vini−Vdd'.

Referring to FIGS. 8B and 9, the sampling duration is performed during a period in which the data voltage Vdata is supplied. In the sampling duration, the first scan signal SC1(*n*), the second scan signal SC2(*n*), and the emission signal EM(n) can be input as a high-level voltage. The first scan signal SC1(*n*−2) of the pre-previous pixel row can be inputted as a low-level voltage.

In this case, the first TFT T1 and the third TFT T3 can be turned-on by the first scan signal SC1(*n*). The fourth TFT T4 is turned-on according to the emission signal EM, and the fifth TFT T5 can be turned-off according to the emission signal EM. Accordingly, the data voltage Vdata can be charged in the first capacitor C1.

In the embodiment, a 'Vdd+Vth' level voltage corresponding to a sum of threshold voltage Vth of the driving TFT DT and high-potential voltage Vdd can be charged to the first node n1 by the first TFT T1 during the sampling duration. Therefore, the threshold voltage of the driving TFT DT can be sensed.

According to the embodiment of the present invention, in the sampling duration, the voltage corresponding to the sum of high-potential voltage Vdd and threshold voltage Vth can be inputted to the gate electrode of the driving TFT DT. The high-potential voltage Vdd can be inputted to the source electrode of the driving TFT DT. In this case, the gate-to-source voltage of the driving TFT DT can correspond to the threshold voltage Vth.

Referring to FIGS. 8C and 9, the emission duration is performed after the sampling duration. In the emission duration, the first scan signal SC1(*n*), the second scan signal SC2(*n*), the first scan signal SC1(*n*−2) of the pre-previous pixel row, and the emission signal EM can be inputted as a low-level voltage.

In this case, the fifth TFT T5 and the sixth TFT T6 are turned-on, and the first TFT T1 to the fourth TFT T4 can be turned-off. An OLED driving voltage corresponding to a voltage stored in the first capacitor C1 is supplied to the emission element OLED based on the fifth TFT T5 being turned-on, and thus the emission element OLED can emit light.

According to the embodiment, in the emission duration, 'Vdd+Vth+(Vref−Vdata)' can be inputted to the gate electrode of the driving TFT DT. The high-potential voltage Vdd can be inputted to the source electrode of the driving TFT DT. In this case, the gate-to-source voltage of the driving TFT DT can correspond to 'Vth+(Vref−Vdata)'.

In the embodiment, according as the display apparatus is continuously driven, a hysteresis phenomenon in which the threshold voltage Vth of the driving transistor changes can occur. To this end, the refresh frame can include a first OBS (On Bias Stress) duration OBS1 to mitigate the hysteresis of the driving TFT DT. A predetermined bias voltage can be inputted to the driving TFT DT in the first OBS duration. In this case, the gate-to-source voltage Vgs of the driving TFT DT can be constantly maintained so that it is possible to overcome a flicker phenomenon which might occur in the display apparatus. The sampling duration can be performed after the first OBS duration. According to a driving method of the first OBS duration, an OBS driver can be additionally included in the display apparatus, but not necessarily.

Referring to FIG. 9, the first scan signal SC2(*n*−2) of the pre-previous pixel row is inputted as a low-level voltage in the other portions of the first OBS duration OBS1 except the initial duration. In this case, the second TFT T2 can be turned-off.

According to the embodiment of the present disclosure, the OBS duration can be referred to as a compensation duration. In this case, the first OBS duration can be referred to as a first compensation duration, and a second OBS duration to be described later can be referred to as a second compensation duration. The threshold voltage Vth of the driving TFT DT can be changed based on the compensation voltage in the compensation duration.

Figure 10A:
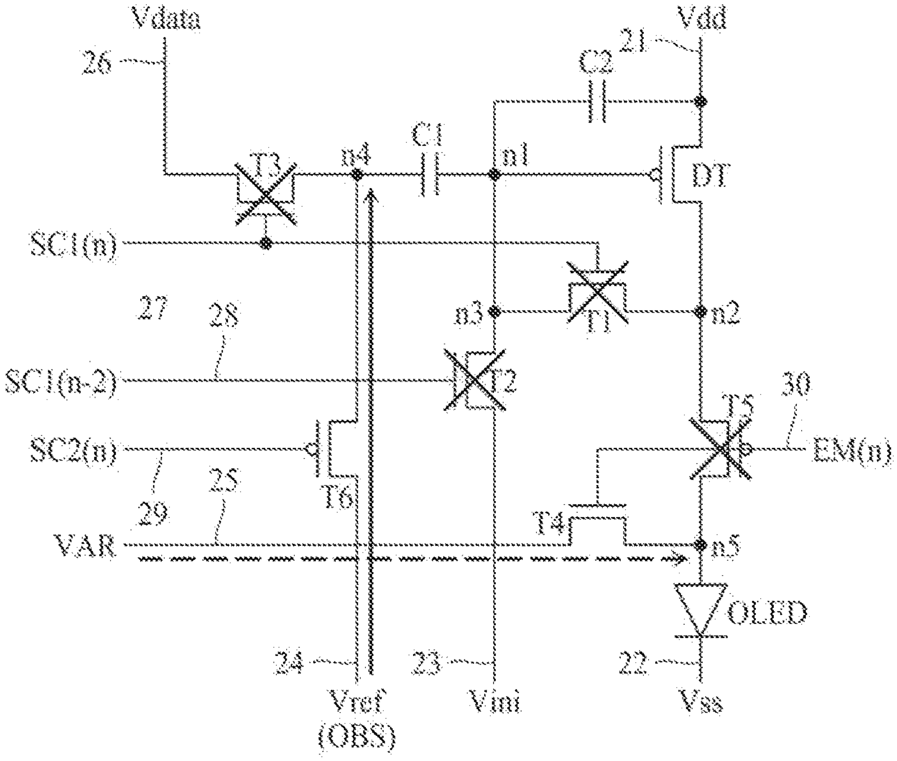
FIGS. 10A and 10B illustrate a driving in an anode reset frame of the pixel circuit of the display apparatus according to another embodiment of the present disclosure.
Figure 10B:
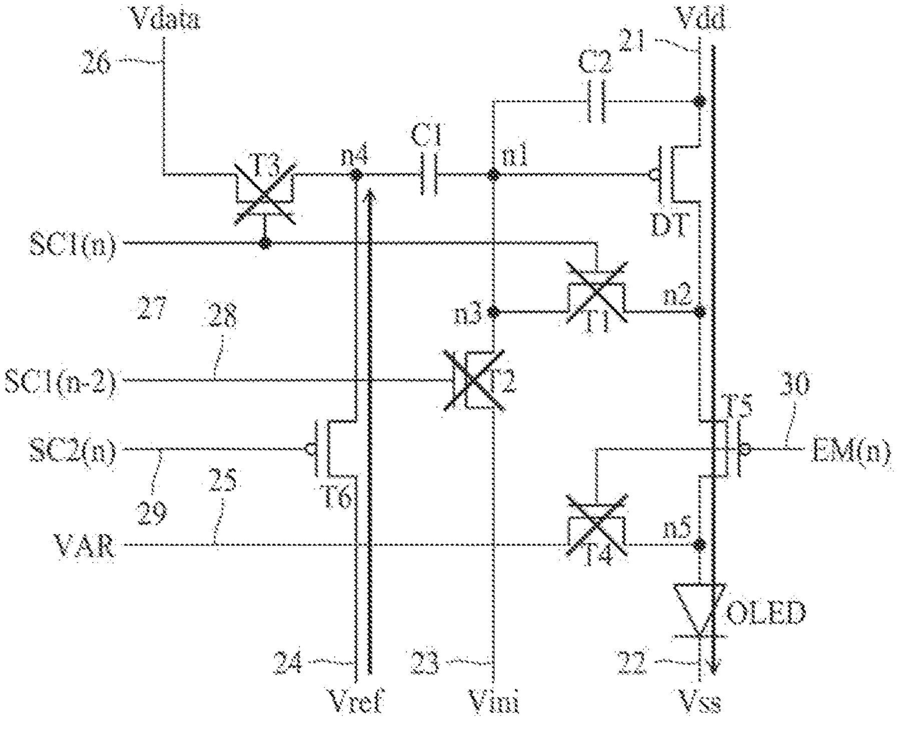
Figure 11:
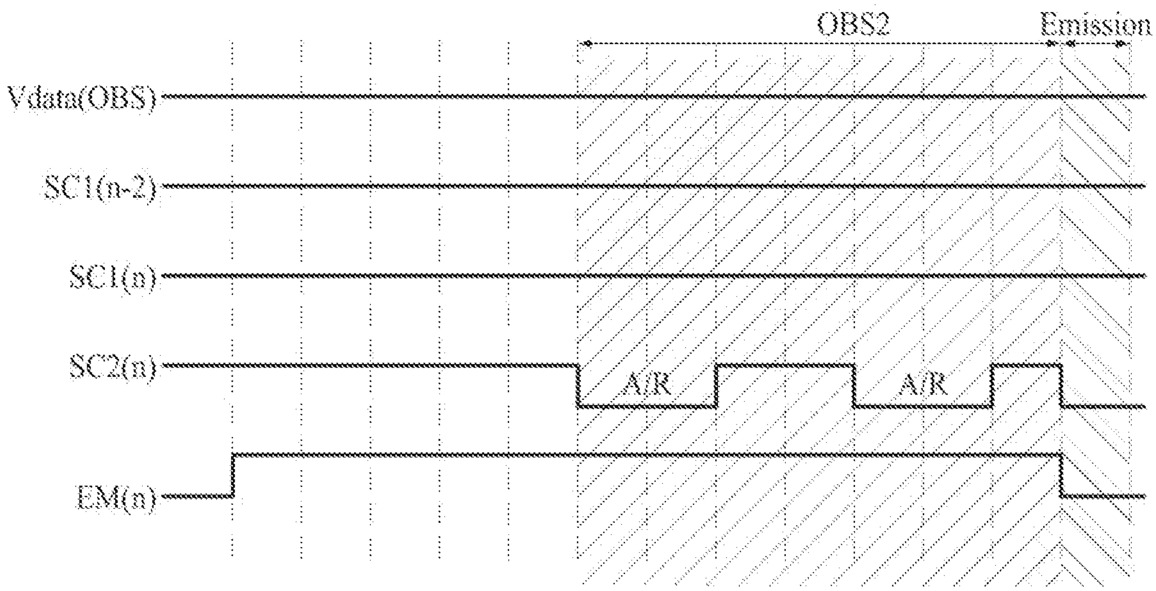
FIG. 11 illustrates a driving waveform in the anode reset frame of the display apparatus according to another embodiment of the present disclosure.

FIGS. 10A and 10B illustrate a driving in an anode reset frame of the pixel circuit of the display apparatus according to another embodiment of the present disclosure. FIG. 11 illustrates a driving waveform in the anode reset frame of the display apparatus according to another embodiment of the present disclosure. Hereinafter, the same contents as those described above can be omitted.

The pixel circuit of the display apparatus can include a reset duration A/R and an emission duration in the anode reset frame (or anode reset period). In this case, FIG. 10A shows the reset duration, and FIG. 10B shows the emission duration. FIG. 11 shows a signal waveform for each duration of the anode reset frame.

In the embodiment of the present disclosure, a case in which the emission duration is included in the anode reset frame is exemplarily illustrated, but not limited thereto. The emission duration can be distinguished from the anode reset frame according to the embodiment of the present disclosure.

The anode reset frame is a period for initializing the anode electrode of the emission element. The anode reset frame can prevent a deterioration of quality, which might occur in the emission element when the pixel is driven for a predetermined time or more.

Referring to FIGS. 10A and 11, the reset duration can be performed during a period in which the data voltage is not supplied. In the reset duration, the first scan signal SC1(*n*), the first scan signal SC1(*n*−2) of the pre-previous pixel row, and the second scan signal SC2(*n*) can be inputted as a low-level (or first-level) voltage. In the reset duration, the emission signal EM can be inputted as a high-level (or second level, herein, second level>first level) voltage.

In this case, the fourth TFT T4 and the sixth TFT T6 are turned-on, whereby the fourth node n4 is initialized to the reference voltage Vref, and the fifth node n5 is initialized to the reset voltage VAR. Accordingly, the anode electrode of the emission element OLED can be initialized to the reset voltage VAR.

In the embodiment, since the second TFT T2 is in a turn-off state during the reset duration A/R, the initialization voltage may not be inputted to the gate electrode of the driving TFT DT. For example, in the reset duration, the anode electrode of the emission element OLED can be initialized separately from the driving TFT DT.

Referring to FIG. 11, the anode reset frame can include the second OBS duration OBS2. The second OBS duration OBS2 can be a duration for mitigating hysteresis of the driving TFT DT. The reset duration A/R can be included in the second OBS duration OBS2. A predetermined bias voltage can be inputted to the driving TFT DT in the second OBS duration OBS2. In this case, the gate-to-source voltage Vgs of the driving TFT DT can be constantly maintained so that it is possible to overcome a flicker phenomenon which might occur in the display apparatus. The sampling duration can be performed after the second OBS duration OBS2. According to a driving method of the second OBS duration, an OBS driver can be additionally included in the display apparatus, but not necessarily.

The second scan signal SC2(*n*) can be inputted as a high-level voltage in the other portions of the second OBS duration OBS2 except the reset duration A/R. In this case, the sixth TFT T6 can be turned-off. In this case, the reference voltage Vref can be input to the gate node of the driving TFT DT. Accordingly, the source-to-drain voltage Vgs of the driving TFT DT can be restored to a previous setting value. In this case, the threshold voltage variation is minimized, thereby stably driving the pixel circuit.

Referring to FIGS. 10B and 11, the emission duration is performed after the reset duration A/R. During the emission duration, the first scan signal SC1(*n*), the second scan signal SC2(*n*), the first scan signal SC1(*n*−2) of the pre-previous pixel row, and the emission signal EM can be input as a low-level voltage.

In this case, the fifth TFT T5 and the sixth TFT T6 are turned-on, and the first TFT T1 to fourth TFT T4 can be turned-off. According as the fifth TFT T5 is turned-on, an OLED driving voltage corresponding to a voltage stored in the first capacitor C1 is supplied to the emission element OLED, whereby the emission element OLED can emit light.

In the embodiment of the present disclosure, the emission duration of the refresh frame and the anode reset frame can be the duration in which the same operation is performed.

Figure 12:
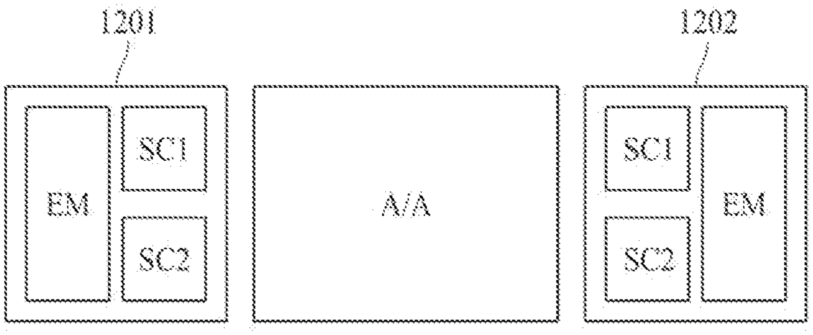
FIG. 12 illustrates an example of a gate driving circuit included in the display apparatus according to the embodiment of the present disclosure.

FIG. 12 illustrates an example of a gate driving circuit included in the display apparatus according to the embodiment of the present disclosure. Specifically, FIG. 12 describes a case in which a gate driving circuit is symmetrically arranged.

Referring to FIG. 12, the gate driving circuit can be formed on at least one side of an active area AA formed in a display panel (e.g., the display panel 10 of FIG. 1). The gate driving circuit is connected to the active area AA and is configured to provide a signal for driving the display panel to the active area AA.

According to the embodiment, the gate driving circuit can be divided into two regions and can be disposed on one side and the other side of the active area AA, respectively. For example, the first region 1201 of the gate driving circuit can be disposed on the left side of the active area AA, and the second region 1202 can be disposed on the right side of the active area AA. As another example, if the active area is formed in a circular (or oval, polygonal, amorphous) shape, a first region 1201 can be arranged to be adjacent to at least a portion of the edge of the active area AA, and a second region 1202 can be arranged to be adjacent to at least another portion of the edge of the active area AA.

In the embodiment, the first region 1201 and the second region 1202 of the gate driving circuit, which are divided into two regions, are symmetrical to each other.

More specifically, each of the first region 1201 and the second region 1202 of the gate driving circuit can include an emission signal stage EM, a first scan signal stage SC1, and a second scan signal stage SC2. The emission signal stage EM can provide an emission signal to the pixel circuit. The first scan signal stage SC1 can provide a first scan signal to the pixel circuit. The second scan signal stage SC2 can provide a second scan signal to the pixel circuit.

Each stage can be arranged such that the first region 1201 and the second region 1202 are symmetrical to each other with the active area AA interposed therebetween. In this case, the gate driving circuit can simultaneously provide a signal for driving the pixel to one pixel circuit in each of the first region 1201 and the second region 1202. This signal providing method effectively reduces the time required for signal transmission, thereby enabling pixel driving to be rapidly performed.

In the embodiment, the width in each of the first region 1201 and the second region 1202 of the gate driving circuit can be 350 μm to 450 μm. However, this is merely an example, and the embodiment is not limited thereto.

According to the embodiment of the present disclosure, the first region 1201 can be referred to as a first gate driving circuit, and the second region 1202 can be referred to as a second gate driving circuit, but embodiments of the present disclosure are not limited to these terms. In addition, each region of the gate driving circuit can further include other components according to the embodiment of the present disclosure. For example, when a third scan signal is provided to the pixel circuit, a third scan signal stage for providing the third scan signal can be further included, and the third scan signal stage can be arranged to be symmetrical to each of the first region 1201 and the second region 1202.

Figure 13:
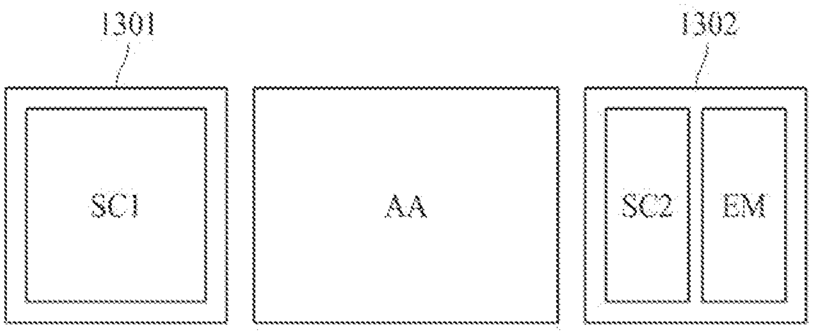
FIG. 13 illustrates another example of a gate driving circuit included in the display apparatus according to the embodiment of the present disclosure.

FIG. 13 illustrates another example of a gate driving circuit included in the display apparatus according to the embodiment of the present disclosure. Specifically, FIG. 13 describes a case in which a gate driving circuit is asymmetrically arranged. Hereinafter, redundant descriptions related to FIG. 12 can be omitted or provided in a simplified manner.

Referring to FIG. 13, the gate driving circuit can be divided into a first region 1301 and a second region 1302, and can be disposed on at least two sides of the active area AA. For example, the first region 1301 can be disposed on the left side of the active area AA, and the second region 1302 can be disposed on the right side of the active area AA. As another example, if the active area is formed in a circular (or oval, polygonal, amorphous) shape, the first region 1301 can be arranged to be adjacent to at least a portion of the edge of the active area AA, and the second region 1302 can be arranged to be adjacent to at least another portion of the edge of the active area AA.

In the embodiment, the first region 1301 and the second region 1302 of the gate driving circuit divided into two can include the different structures from each other. For example, as shown in the drawings, the first region 1301 can include a first scan signal stage SC1, and the second region 1302 can include an emission signal stage EM and a second scan signal stage SC2. In another example, the first region 1301 can include a second scan signal stage SC2, and the second region 1302 can include an emission signal stage EM and a first scan signal stage SC1.

According to the embodiment of the present disclosure, the gate driving circuit can further include a configuration for providing a specific signal to the pixel circuit (hereinafter, a specific signal stage). In this case, the specific signal stage can be implemented to be included in at least one of the first region 1301 and the second region 1302. For example, the specific signal stage can be implemented to be included in the first region 1301. For another example, the specific signal stage can be divided into two, and can be included in each of the first region 1301 and the second region 1302. In this case, the specific signal stage included in each of the first region 1301 and the second region 1302 can be symmetrical.

A display apparatus according to the embodiment of the present disclosure can comprise a data driving circuit, a gate driving circuit, and a pixel circuit including a first oxide transistor, a second oxide transistor, a driving transistor, a first transistor, and an emission element. The driving transistor includes a gate electrode, a source electrode, and a drain electrode, and the first oxide transistor and the second oxide transistor can be connected to the gate electrode. The first transistor can be connected to a source electrode or a drain electrode.

A display apparatus according to the embodiment of the present disclosure can comprise a data driving circuit, a gate driving circuit, and a pixel circuit including an emission element. The display apparatus can drive the pixel circuit with a refresh frame for programming a data voltage for the pixel circuit and a reset frame (or anode reset frame) for resetting an anode electrode of the emission element by the data driving circuit and the gate driving circuit. The refresh frame includes an initial duration, a sampling duration, and an emission duration. An (n)th scan signal SC1(*n*) is applied as a first level in the initial duration, an (n−2)th scan signal SC1($n$−2) is applied as a second level higher than the first level, an emission signal is applied as a high level, and an (n)th additional scan signal SC2($n$) can be applied as a first level, where 'n' is a natural number.

In the embodiment of the present disclosure, the display apparatus can comprise a plurality of pixels arranged in a row. In this case, the embodiment of the pixel circuit described in the present disclosure can correspond to the pixel arranged in the (n)th row among the plurality of pixels. The (n)th scan signal SC1($n$) can include a signal applied to a first scan line of the (n)th row, and the (n−2)th scan signal SC1($n$−2) can include a signal applied to a first scan line of the (n−2)th row. The (n)th additional scan signal SC2($n$) can include a signal applied to a second scan line of the (n)th row.

According to the embodiment of the present disclosure, the pixel circuit further includes a compensation duration (or On Bias Stress duration), and the initial duration can be included in the compensation duration. The pixel circuit can include a driving transistor DT, and a threshold voltage of the driving transistor DT can be changed based on a compensation voltage in the compensation duration.

The (n)th scan signal SC1($n$), the (n)th additional scan signal SC2($n$), and the emission signal EM can be applied as the second level in the sampling duration, and the (n−2)th scan signal SC1($n$−2) can be applied as the first level in the sampling duration.

In the emission duration, the (n)th scan signal SC1($n$), the (n−2)th scan signal SC1($n$−2), the (n)th additional scan signal SC2($n$), and the emission signal EM can be applied as the first level.

The reset frame includes a reset duration. In the reset duration, the (n)th scan signal SC1($n$), the (n−2)th scan signal SC1($n$−2), the (n)th additional scan signal SC2($n$) are applied as the first level, and the emission element EM can be applied as the second level.

According to the embodiment of the present disclosure, the first level can correspond to the low voltage and the second level can correspond to the high voltage. For example, the first level of the predetermined two voltage ranges can correspond to a lower voltage range and the second level can correspond to a higher voltage range.

The pixel circuit according to some embodiments of the present disclosure and the display apparatus comprising the pixel circuit will be described as follows.

The pixel circuit according to some embodiments of the present disclosure can include a first oxide transistor connected to a first node, a second oxide transistor connected to the first node, a driving transistor including a gate electrode connected to the first node, a first electrode connected to a first voltage supply line, and a second electrode connected to a second node, and a first transistor and an emission element connected to the second node.

The pixel circuit according to some embodiments of the present disclosure can further include a first capacitor connected between the first node and a fourth node.

The pixel circuit according to some embodiments of the present disclosure can further include a second capacitor connected between the first node and the first voltage supply line.

The pixel circuit according to some embodiments of the present disclosure can further include a third oxide transistor connected between a data line and the fourth node, and a fourth oxide transistor connected between a reset voltage supply line and a fifth node between the first transistor and the emission element.

In the pixel circuit according to some embodiments of the present disclosure, the first transistor can include a low temperature polycrystalline silicon LTPS transistor.

In the pixel circuit according to some embodiments of the present disclosure, a first scan signal provided by a first scan line can be applied to a gate electrode of the first oxide transistor and the third oxide transistor, and a first scan signal provided by a first scan line of a pre-previous pixel row can be applied to a gate electrode of the second oxide transistor.

In the pixel circuit according to some embodiments of the present disclosure, an emission signal can be applied to a gate electrode of the first transistor, and the first transistor can be controlled by the emission signal and be configured to connect the second node and the emission element.

In the pixel circuit according to some embodiments of the present disclosure, the emission signal can be applied to a gate electrode of the fourth oxide transistor, and the fourth oxide transistor can be controlled by the emission signal and be configured to supply a reset voltage of the reset voltage supply line to the fifth node.

In the pixel circuit according to some embodiments of the present disclosure, conductive types of the first transistor and the fourth oxide transistor can be different from each other.

In the pixel circuit according to some embodiments of the present disclosure, the first transistor and the fourth oxide transistor can be turned-on or turned-off to be opposite to each other under the control of the emission signal.

The pixel circuit according to some embodiments of the present disclosure can further include a second transistor controlled by a second scan signal of a second scan line and configured to connect the fourth node to a reference voltage supply line.

In the pixel circuit according to some embodiments of the present disclosure, at least one of the driving transistor, the first transistor, and the second transistor can have a first conductivity type.

In the pixel circuit according to some embodiments of the present disclosure, at least one of the first to fourth oxide transistors can have a second conductivity type.

In the pixel circuit according to some embodiments of the present disclosure, the first oxide transistor can be controlled by the first scan signal of the first scan line and be configured to connect the first node and the second node.

In the pixel circuit according to some embodiments of the present disclosure, the second oxide transistor can be controlled by the first scan signal supplied to the first scan line of the pre-previous pixel row and be configured to connect the first node to an initialization voltage supply line.

A display apparatus according to some embodiments of the present disclosure can include a data driving circuit, a gate driving circuit, and a pixel circuit including a first oxide transistor, a second oxide transistor, a driving transistor, a first transistor, and an emission element, wherein the driving transistor can include a gate electrode, a source electrode, and a drain electrode, and the first oxide transistor and the second oxide transistor can be connected to the gate electrode, and the first transistor can be connected to the source electrode or the drain electrode.

A display apparatus according to some embodiments of the present disclosure can include a data driving circuit, a gate driving circuit, and a pixel circuit including an emission element, wherein the pixel circuit can be driven with a refresh frame for programming a data voltage for the pixel circuit and a reset frame for resetting an anode electrode of the emission element by the data driving circuit and the gate driving circuit, and the refresh frame can include an initial duration, a sampling duration, and an emission duration, wherein, in the initial duration, an (n)th scan signal ('n' is a natural number) can be applied as a first level, an (n−2)th scan signal is applied as a second level higher than the first level, an emission signal can be applied as the second level, and an (n)th additional scan signal is applied as the first level.

In the display apparatus according to some embodiments of the present disclosure, the pixel circuit can correspond to a pixel arranged in the (n)th pixel row among the plurality of pixels, the (n)th scan signal can include a signal applied to a first scan line of the (n)th pixel row, the (n−2)th scan signal can include a signal applied to a first scan line of the (n−2)th pixel row, and the (n)th additional scan signal can include a signal applied to a second scan line of the (n)th pixel row.

In the display apparatus according to some embodiments of the present disclosure, wherein the pixel circuit can further include a compensation duration, and the initial duration is included in the compensation duration.

In the display apparatus according to some embodiments of the present disclosure, the pixel circuit can include a driving transistor, and the driving transistor changes a threshold voltage based on a compensation voltage in the compensation duration.

In the display apparatus according to some embodiments of the present disclosure, the (n)th scan signal, the (n)th additional scan signal, and the emission signal can be applied as the second level in the sampling duration, the (n−2)th scan signal can be applied as the first level in the sampling duration, and the (n)th scan signal, the (n−2)th scan signal, the (n)th additional scan signal, and the emission signal can be applied as the first level in the emission duration.

In the display apparatus according to some embodiments of the present disclosure, the reset frame can include a reset duration, wherein, in the reset duration, the (n)th scan signal, the (n−2)th scan signal, and the (n)th additional scan signal can be applied as the first level, and the emission signal can be applied as the second level.

It will be apparent to those skilled in the art that various substitutions, modifications, and variations are possible within the scope of the present disclosure without departing from the spirit and scope of the present disclosure. Therefore, the scope of the present disclosure is represented by the following claims, and all changes or modifications derived from the meaning, range and equivalent concept of the claims should be interpreted as being included in the scope of the present disclosure.

What is claimed is:

1. A pixel circuit comprising:
- a driving transistor including a gate electrode connected to a first node, a first electrode connected to a first voltage supply line, and a second electrode connected to a second node;
- a first transistor connected between the first node and the second node;
- a second transistor connected to the first node;
- a third transistor connected between a data line and a fourth node;
- a fourth transistor connected between a reset voltage supply line and a fifth node;
- a fifth transistor connected to the second node and the fifth node;
- a sixth transistor connected between a reference voltage supply line and the fourth node;
- an emission element connected to the fifth node; and
- a first capacitor connected between the first node and the fourth node,
- wherein at least two of the first transistor, the second transistor, the third transistor and the fourth transistor are oxide transistors, and
- wherein the sixth transistor is controlled by a second scan signal of a second scan line.

2. The pixel circuit according to claim 1, further comprising a second capacitor connected between the first node and the first voltage supply line.

3. The pixel circuit according to claim 1, wherein the fifth transistor includes a low temperature polycrystalline silicon (LTPS).

4. The pixel circuit according to claim 1, wherein a first scan signal provided by a first scan line is applied to a gate electrode of the first transistor and the third transistor, and
- wherein a first scan signal provided by a first scan line of a pre-previous pixel row is applied to a gate electrode of the second transistor.

5. The pixel circuit according to claim 1, wherein an emission signal is applied to a gate electrode of the fifth transistor, and
- wherein the fifth transistor is controlled by the emission signal and is configured to connect the second node and the emission element.

6. The pixel circuit according to claim 5, wherein the emission signal is applied to a gate electrode of the fourth transistor, and
- wherein the fourth transistor is controlled by the emission signal and is configured to supply the reset voltage of the reset voltage supply line to the fifth node.

7. The pixel circuit according to claim 6, wherein conductive types of the fifth transistor and the fourth transistor are different from each other.

8. The pixel circuit according to claim 6, wherein the fifth transistor and the fourth transistor are turned-on or turned-off to be opposite to each other under control of the emission signal.

9. The pixel circuit according to claim 1, wherein at least one of the driving transistor, the fifth transistor, and the sixth transistor has a first conductivity type, and
- wherein least one of the first to fourth transistors has a second conductivity type.

10. The pixel circuit according to claim 1, wherein the first transistor is controlled by a first scan signal of a first scan line and is configured to connect the first node and the second node, and
- wherein the second transistor is controlled by a first scan signal supplied to a first scan line of a pre-previous pixel row and is configured to connect the first node to an initialization voltage supply line.

11. A display apparatus comprising:
- a data driving circuit;
- a gate driving circuit; and
- a pixel circuit including a driving transistor, and an emission element, the pixel circuit being configured to receive signals from the data driving circuit and the gate driving circuit,
- wherein the driving transistor includes a gate electrode connected to a first node, a first electrode connected to a first voltage supply line, and a second electrode connected to a second node,
- wherein the pixel circuit further comprises:
- a first transistor connected between the first node and the second node;

a second transistor connected to the first node and an initialization voltage supply line;

a third transistor connected between a data line and a fourth node;

a fourth transistor connected between a reset voltage supply line and a fifth node connected to the emission element;

a fifth transistor connected to the second node and the fifth node;

a sixth transistor connected between a reference voltage supply line and the fourth node; and a first capacitor connected between the first node and the fourth node, wherein:

at least two of the first transistor, the second transistor, the third transistor and the fourth transistor are oxide transistors, the first transistor and the third transistor are controlled by a first scan signal, the second transistor is controlled by a first scan signal of a pre-previous pixel row, the sixth transistor is controlled by a second scan signal, and the fourth transistor and the fifth transistor are controlled by an emission signal and are turned-on or turned-off to be opposite to each other.

12. A display apparatus comprising:

a data driving circuit;

a gate driving circuit; and a pixel circuit including an emission element, and configured to receive signals from the data driving circuit and the gate driving circuit, wherein the pixel circuit is driven with a refresh frame for programming a data voltage for the pixel circuit and a reset frame for resetting an anode electrode of the emission element by the data driving circuit and the gate driving circuit, wherein the refresh frame includes an initial duration, a sampling duration, and an emission duration, and wherein, in the initial duration, an (n)th scan signal is applied as a first level, an (n−2)th scan signal is applied as a second level higher than the first level, an emission signal is applied as the second level, and an (n)th additional scan signal is applied as the first level, where n is a natural number.

13. The display apparatus according to claim 12, wherein a plurality of pixels are arranged in pixel rows, the pixel circuit corresponds to a pixel arranged in an (n)th pixel row among the plurality of pixels, the (n)th scan signal includes a signal applied to a first scan line of the (n)th pixel row, the (n−2)th scan signal includes a signal applied to a first scan line of an (n−2)th pixel row, and the (n)th additional scan signal includes a signal applied to a second scan line of the (n)th pixel row.

14. The display apparatus according to claim 12, wherein the pixel circuit further includes a compensation duration, and the initial duration is included in the compensation duration.

15. The display apparatus according to claim 14, wherein the pixel circuit further includes a driving transistor, and the driving transistor changes a threshold voltage based on a compensation voltage in the compensation duration.

16. The display apparatus according to claim 12, wherein the (n)th scan signal, the (n)th additional scan signal, and the emission signal are applied as the second level in the sampling duration, and the (n−2)th scan signal is applied as the first level in the sampling duration, and wherein the (n)th scan signal, the (n−2)th scan signal, the (n)th additional scan signal, and the emission signal are applied as the first level in the emission duration.

17. The display apparatus according to claim 12, wherein the reset frame includes a reset duration, and wherein, in the reset duration, the (n)th scan signal, the (n−2)th scan signal, and the (n)th additional scan signal are applied as the first level, and the emission signal is applied as the second level.

* * * * *